United States Patent
Pan

(10) Patent No.: US 11,912,861 B2
(45) Date of Patent: Feb. 27, 2024

(54) RUBBER COMPOSITION FOR LIGHTER WEIGHT TIRES AND IMPROVED WET TRACTION

(71) Applicant: ExxonMobil Chemical Patents Inc., Baytown, TX (US)

(72) Inventor: Xiao-Dong Pan, Houston, TX (US)

(73) Assignee: ExxonMobil Engineering & Technology Co., Baytown, TX (US)

( * ) Notice: Subject to any disclaimer, the term of this patent is extended or adjusted under 35 U.S.C. 154(b) by 192 days.

(21) Appl. No.: 17/513,445

(22) Filed: Oct. 28, 2021

(65) Prior Publication Data

US 2022/0135789 A1 May 5, 2022

Related U.S. Application Data

(60) Provisional application No. 63/107,151, filed on Oct. 29, 2020.

(51) Int. Cl.
| | |
|---|---|
| *C08L 65/00* | (2006.01) |
| *C08L 9/00* | (2006.01) |
| *B60C 11/00* | (2006.01) |
| *B60C 1/00* | (2006.01) |
| *C08G 61/08* | (2006.01) |
| *C08K 3/04* | (2006.01) |
| *C08K 3/36* | (2006.01) |

(52) U.S. Cl.
CPC ............ *C08L 65/00* (2013.01); *B60C 1/0016* (2013.01); *B60C 11/0008* (2013.01); *C08G 61/08* (2013.01); *C08K 3/04* (2013.01); *C08K 3/36* (2013.01); *C08L 9/00* (2013.01); *B60C 2011/0025* (2013.01); *C08L 2205/025* (2013.01); *C08L 2312/00* (2013.01)

(58) Field of Classification Search
CPC ............................... B60C 1/0016; C08L 65/00
See application file for complete search history.

(56) References Cited

U.S. PATENT DOCUMENTS

| | | | |
|---|---|---|---|
| 3,598,796 A | 8/1971 | Nutzel et al. | 260/88.2 |
| 3,615,972 A | 10/1971 | Morehouse et al. | 156/79 |
| 3,631,010 A | 12/1971 | Witte et al. | 260/82.1 |
| 3,707,520 A | 12/1972 | Pampus et al. | 260/33.6 |
| 3,925,514 A | 12/1975 | Kohler et al. | 260/889 |
| 3,941,757 A | 3/1976 | Wakabayashi et al. | 260/80.78 |
| 4,002,815 A | 1/1977 | Minchak | 526/283 |
| 4,239,484 A | 12/1980 | Schuster | 432/77 |

(Continued)

FOREIGN PATENT DOCUMENTS

| | | | |
|---|---|---|---|
| CA | 1074949 | 4/1980 | ............ C08F 232/08 |
| CN | 2018/8001293 | 10/2018 | ......... G06F 16/9536 |

(Continued)

OTHER PUBLICATIONS

U.S. Appl. No. 62/984,636, filed Mar. 3, 2020, Galuska, A et al.

(Continued)

*Primary Examiner* — Arrie L Reuther

(57) ABSTRACT

This invention relates to a rubber compound for tire treads, comprising:
30 to 70 parts by weight per hundred parts by weight rubber (phr) of a cyclopentene ring-opening rubber having a Tg of −120° C. to −80° C. and a ratio of cis to trans of 5:95 to 40:60; and 20 phr to 60 phr of a high vinyl polybutadiene rubber.

15 Claims, 3 Drawing Sheets

(56) References Cited

U.S. PATENT DOCUMENTS

| | | |
|---|---|---|
| 5,120,779 A | 6/1992 | Cornell et al. ............... 524/100 |
| 5,750,625 A | 5/1998 | Medsker et al. ............. 525/133 |
| 6,582,633 B2 | 6/2003 | Elfving et al. ................ 264/53 |
| 7,915,354 B2 | 3/2011 | Wouters et al. ............... 526/65 |
| 8,227,371 B2 | 7/2012 | Holtcamp et al. ........... 502/152 |
| 8,604,148 B2 | 12/2013 | Holtcamp et al. ........... 526/281 |
| 8,889,786 B2 | 11/2014 | Tsunogae et al. ........... 524/588 |
| 8,889,806 B2 | 11/2014 | Tsunogae et al. ........... 526/308 |
| 9,441,098 B1 | 9/2016 | Isitman et al. ............... 524/526 |
| 9,708,435 B2 | 7/2017 | Blok et al. ........... C08F 299/00 |
| 10,072,101 B2 | 9/2018 | Tsunogae et al. ........ C08C 1/15 |
| 2002/0166629 A1 | 11/2002 | Caster et al. .............. 156/309.3 |
| 2009/0192277 A1 | 7/2009 | Yoon et al. ................... 526/171 |
| 2012/0077945 A1 | 3/2012 | Holtcamp et al. ........... 526/171 |
| 2013/0041122 A1 | 2/2013 | Holtcamp et al. ........... 526/171 |
| 2016/0002382 A1 | 1/2016 | Tsunogae et al. .... C08F 230/08 |
| 2016/0289352 A1 | 10/2016 | Blok et al. ............. C08F 132/08 |
| 2017/0233560 A1 | 8/2017 | Kuramoto et al. ......... C08L 9/06 |
| 2017/0247479 A1 | 8/2017 | Kuramoto et al. ....... C08F 4/14 |
| 2017/0292013 A1 | 10/2017 | Blok et al. ................ C08L 9/06 |
| 2018/0244837 A1 | 8/2018 | Nitadori et al. ....... C08G 61/06 |
| 2019/0040186 A1 | 2/2019 | Faler ....................... C08G 61/08 |
| 2020/0231744 A1* | 7/2020 | Nitadori ................ B60C 1/0025 |

FOREIGN PATENT DOCUMENTS

| | | | |
|---|---|---|---|
| EP | 2524935 | 5/2016 | ............. C08G 61/08 |
| JP | 2019/081839 A | 5/2019 | ............... C08K 3/04 |
| JP | 2019/081840 A | 5/2019 | ............. C08G 61/08 |
| WO | WO1999/043758 | 9/1999 | ............. B01J 13/18 |
| WO | WO1999/046320 | 9/1999 | ............. B01J 13/02 |
| WO | WO2018/173968 | 9/2018 | ............... B60C 1/00 |
| WO | WO2021/178233 | 9/2021 | ................ C08L 9/06 |

OTHER PUBLICATIONS

Chemical and Engineering News, v.63(5), p. 27 (1985).
Autenrieth, B. et. al. (2015) "Stereospecific Ring-Opening Metathesis Polymerization (ROMP) of endo-Dicyclopentadiene by Molybdenum and Tungsten Catalysts," *Macromolecules*, v.48(8), pp. 2480-2492.
Bhagawan, S. S. et al. (1987) "Effect of Fillers on Thermoplastic 1,2-Polybutadiene Rubber: Mechanical and Viscoelastic Properties," *Jrnl. of App. Poly. Sci.*, v.34, pp. 1581-1601.
Dounis. et. al. (1995) "Ring-Opening Metathesis Polymerization of Monocyclic Alkenes using Molybdenum and Tungsten Alkylidene (Schrock-Type) Initiators and 13C Nuclear Magnetic Resonance Studies of the Resulting Polyalkenamers," *Polymer*, v.36(14), pp. 2787-2796.
Haas, F. et al. (1970) "Properties of a Trans-1,5-Polypentenamer Produced by Polymerization through Ring Cleavage of Cyclopentene," *Rubber Chemistry and Technology*: Sep. 1970, v.43(5), pp. 1116-1128.
Yao et al. (2012) "Ring-Opening Metathesis Copolymerization of Dicyclopentadiene and Cyclopentene Through Reaction Injection Molding Process," *Jrnl. of App. Poly. Sci.*, v.125(4), pp. 2489-2493.

* cited by examiner

RUBBER COMPOSITION FOR LIGHTER WEIGHT TIRES AND IMPROVED WET TRACTION

CROSS REFERENCE TO RELATED APPLICATIONS

This application claims priority to and the benefit of U.S. Ser. No. 63/107,151 filed Oct. 29, 2020.

This application is related to concurrently filed PCT PCT/US2021/019840 entitled "Rubber Compounds for Passenger Tire Treads and Methods Relating Thereto" which claims priority to U.S. Ser. No. 62/984,630, filed on Mar. 3, 2020.

This application is related to concurrently filed PCT PCT/US2021/019854 entitled "Rubber Compounds for Heavy-Duty Truck and Bus Tire Treads and Methods Relating Thereto" which claims priority to U.S. Ser. No. 62/984,636, filed Mar. 3, 2020.

FIELD OF THE INVENTION

Embodiments of the present invention generally relate to rubber compounds for vehicle tire tread. More particularly, such embodiments relate to rubber blends comprising long chain branched cyclopentene ring-opening rubber and high vinyl polybutadiene rubber that are suitable for making lighter weight tires with improved wet skid resistance.

BACKGROUND

The global automotive tire market has grown significantly over the past decade, which can be attributed to the increasing need for high performance tires over a variety of vehicle types (e.g., passenger cars, heavy-duty trucks, and the like). Consequently, adaptation to the automotive landscape has become a crucial investment by the tire companies, seeking to meet the changing demands for durability and other important tires properties (e.g., rolling resistance, tread wear, and wet traction). The tread rubber formulations play an essential role in achieving the performance targets for such properties. However, tire performance properties like rolling resistance and wet grip are inversely related such that an improvement in one of these properties is to the detriment of the other. Accordingly, the tire industry faces constant challenges for developing new and improved materials that would lead to improvement in all the desired tire performance.

Typically, tire tread rubber formulations include a blend of rubbers of varied glass transition temperatures. Commonly, rubbers having low glass transition temperature are known to improve tread wear and rolling resistance, while rubbers having high glass transition temperature typically improve traction characteristics. Particularly, rubbers having low glass transition temperature can improve rolling loss and wear resistance, though, at the expense of skid resistance properties. Hence, seeking for the optimal formulation to reach the desired properties described above is still ongoing.

The most commonly used synthetic tire rubbers are styrene-butadiene rubber and butadiene rubber. The production of such synthetic rubbers traditionally employs Ziegler-Natta catalysis. The resulting rubber microstructure plays a significant role in the tire properties in terms of manufacturing as the microstructure relates to different polymer properties, such as glass transition temperature and crystallinity. Therefore, the control of the rubber microstructure in synthetic rubbers may be used to tune the properties of the resultant rubber formulation.

Rubbers made from the ring opening metathesis polymerization of cyclopentene, referred to as polypentenamer rubbers, have been developed as an alternative to butadiene rubber and styrene-butadiene rubber. However, the resulting cross-linked rubbers from these polypentenamers have been typically insufficient in wet skid resistance.

There is still a need, therefore, for improved rubber blends to improve wet skid resistance for driving safety, improve wear resistance for reduced pollution, and that are lighter to improve fuel economy.

References of interest include US patent numbers: U.S. Pat. Nos. 3,925,514; 7,915,354; 9,441,098; 3,598,796, 3,631,010, 3,707,520, 3,778,420, 3,941,757, 4,002,815, 4,239,484, 5,120,779, 8,227,371, 8,604,148, 8,889,786, 8,889,806, 9,708,435, and 10,072,101; US patent application publication numbers: US 2002/0166629, US 2009/0192277, US 2012/0077945, US 2013/0041122, US 2016/0002382, US 2016/0289352, US 2017/0233560, US 2017/0247479, US 2017/0292013, and US 2018/0244837; European patent number: EP 2524935; Canadian patent number: CA 1,074,949; Chinese Pat. App. Pub. No. CN 2018/8001293; PCT patent application publication number WO 2018/173968; Japanese patent application publication numbers JP 2019/081839A and JP 2019/081840A; Bhagawan, S. S. et al. (1987) "Effect of fillers on thermoplastic 1,2-polybutadiene rubber: Mechanical and viscoelastic properties," *Jrnl. of App. Poly. Sci.*, v. 34, pp. 1581-1601 (1987); Haas, F. et al. (1970) "Properties of a Trans-1,5-Polypentenamer Produced by Polymerization through Ring Cleavage of Cyclopentene," *Rubber Chemistry and Technology*: September 1970, v. 43(5), pp. 1116-1128; and Yao et al. (2012) "Ring-Opening Metathesis Copolymerization of Dicyclopentadiene and Cyclopentene Through Reaction Injection Molding Process," *Jrnl. of App. Poly. Sci.*, v. 125, pp. 2489-2493 (2012).

SUMMARY OF THE INVENTION

The present disclosure relates to a rubber compound for tire treads, comprising:
1) 30 to 70 parts by weight per hundred parts by weight rubber (phr) of a cyclopentene ring-opening rubber having a glass transition temperature (Tg) of −120° C. to −80° C. and a ratio of cis to trans of 5:95 to 40:60;
2) 20 phr to 60 phr of a high vinyl polybutadiene rubber;
3) optional curative (preferably 0.1 to 20 phr curative, such as stearic acid, zinc oxide, sulfur, CBS (n-cyclohexyl-2-benzothiazole sulfonamide) and DPG (diphenyl guanidine), is present);
4) optional process oil; and
5) optional reinforcing filler.

This invention also relates to a method for making rubber compound for tire treads, comprising: compounding 5 to 100 phr of a cyclopentene ring-opening rubber having a glass transition temperature (Tg) of −120° C. to −80° C. and a ratio of cis to trans of 5:95 to 40:60; 20 phr to 60 phr of a high vinyl polybutadiene rubber; 30 phr to 90 phr of a reinforcing filler; and 0.5 phr to 20 phr of a process oil; and optional curative (preferably curative, such as stearic acid, zinc oxide, sulfur, CBS (n-cyclohexyl-2-benzothiazole sulfonamide) and DPG (diphenyl guanidine), is present).

This invention also relates to tire tread made of rubber compound comprising:

- 5 to 100 phr of a cyclopentene ring-opening rubber cyclopentene ring-opening rubber having a glass transition temperature (Tg) of −120° C. to −80° C. and a ratio of cis to trans of 5:95 to 40:60;
- 20 phr to 60 phr of a high vinyl polybutadiene rubber;
- 30 phr to 90 phr of a reinforcing filler;
- 0.5 phr to 20 phr of a process oil; and
- optional curative (preferably curative, such as stearic acid, zinc oxide, sulfur, CBS (n-cyclohexyl-2-benzothiazole sulfonamide) and DPG (diphenyl guanidine), is present).

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
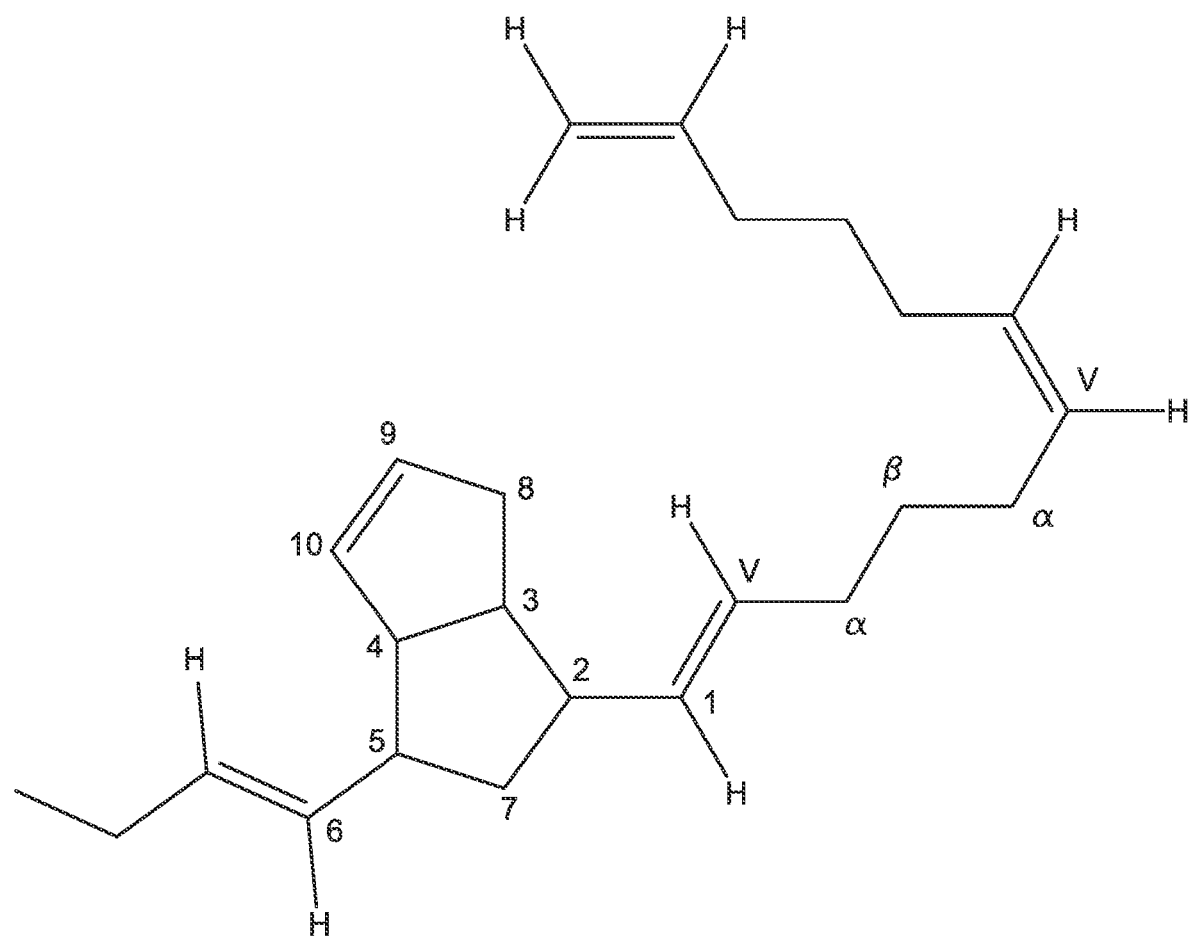
FIG. 1 (FIG. 1) is a copolymer with $^{13}$C NMR assignments for determining the DCPD cis/trans ratio.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. The embodiments presented below can be combined in any combination of ways, i.e., any element from one embodiment can be used in any other embodiment, without departing from the scope of the disclosure.

The present disclosure relates to rubber compounds comprising cyclopentene rubber made by the ring opening metathesis of cyclopentene and optional diene comonomer, such as dicyclopentadiene, ("cyclopentene ring opening rubber" or "CPR") and a rubber selected from a group consisting of natural rubber (NR), butadiene rubber (BR) (such as high vinyl polybutadiene rubber (VBR)), and combinations thereof, that are suitable for use in heavy-duty truck and bus tire treads, and other articles comprising such blends of CPR, NR, and/or BR. Heavy-duty truck and bus tire treads may have a tread depth of 32/32 inches or less, or 3/32 inches or greater, or 3/32 inches to 32/32 inches, or 5/32 inches to 28/32 inches, or 9/32 inches to 25/32 inches, or 12/32 inches to 25/32 inches.

Embodiments of the present disclosure include rubber compounds comprising an immiscible blend of:

(a) a CPR, such as CPR having long chain branching, (e.g., present at 5 phr to 100 phr, or 10 phr to 95 phr, or 15 phr to 80 phr, or 20 phr to 75 phr, or 30 phr to 70 phr) having a glass transition temperature (Tg) of −120° C. to −80° C. (or −110° C. to −85° C., or −100° C. to −90° C.) and a ratio of cis to trans of 30:70 to 10:90 (or 20:80 to 10:90, or 15:85 to 10:90);

(b) a rubber selected from a group consisting of a NR, a BR (such as high vinyl BR), and a combination thereof (e.g., present at 0 phr to 95 phr, or 5 phr to 90 phr, or 10 phr to 80 phr, or 15 phr to 70 phr, or 20 phr to 60 phr, or 30 phr to 50 phr, alternately at 50 phr to 95 phr), wherein the rubber has a ratio of cis to trans of 70:30 to 100:0 (75:15 to 95:15, or 80:20 to 90:10, or 15:85 to 10:90);

(c) a reinforcing filler (e.g., present at 30 phr to 90 phr, or 35 phr to 85 phr, or 40 phr to 80 phr); and (d) a process oil (e.g., present at 0.5 phr to 20 phr, or 1 phr to 15 phr, or 2 phr to 10 phr).

Advantageously, such compositions provide improved reduction of tire rolling loss, and enhancement of wet skid resistance and wear resistance, processability and strength. Because of these improved properties, the rubber compounds described herein may be useful in producing higher quality heavy-duty truck and bus tires.

The present disclosure also relates to the methods for making the foregoing rubber compounds comprising: blending the CPR with rubber selected from a group consisting of a NR, a BR (such as high vinyl BR), and a combination thereof, reinforcing fillers, a process oil, curatives, and optionally other additives.

Said rubber compounds may be useful in tire treads to improve reduction of tire rolling loss, enhance of wet skid resistance, and enhance wear resistance.

Definitions and Test Methods

Certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function.

Additionally, in the following discussion and in the claims, the terms "including" and "comprising" are used in an open-ended fashion, and thus should be interpreted to mean "including, but not limited to." The phrase "consisting essentially of" means that the described/claimed composition does not include any other components that will materially alter its properties by any more than 5% of that property, and in any case does not include any other component to a level greater than 3 mass %.

The new notation for the Periodic Table Groups is used as described in *Chemical and Engineering News*, v. 63(5), pg. 27 (1985).

Unless otherwise indicated, room temperature is 23° C.

The following abbreviations are used herein: ROMP is ring-opening metathesis polymerization; NR is natural rubber, CPR is cyclopentene ring-opening rubber, BR is polybutadiene rubber; LCB is long chain branched; LCB-CPR is a cyclopentene ring-opening rubber having long chain branching; VBR is high vinyl polybutadiene rubber, SBR is styrene-butadiene rubber; BHT is butylated hydroxytoluene; THF or thf is tetrahydrofuran; Me is methyl; iPr is isopropyl; Ph is phenyl; cC5 is cyclopentene; DCPD is dicyclopentadiene; NBE is norbornene; Tb is tensile stress at break; Eb is elongation at break; wt % is weight percent; and mol % is mole percent.

An "olefin," alternatively referred to as "alkene," is a linear, branched, or cyclic compound of carbon and hydrogen having at least one double bond.

A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "polymer" as used herein includes, but is not limited to, homopolymers, copolymers, terpolymers, etc. The term "polymer" as used herein also includes impact, block, graft, random, and alternating copolymers. The term "polymer" shall further include all possible geometrical configurations unless otherwise specifically stated. Such configurations may include isotactic, syndiotactic, and random symmetries. "Different" as used to refer to monomer mer units indicates that the mer units differ from each other by at least one atom or are different isomerically.

The term "blend" as used herein refers to a mixture of two or more polymers. Blends may be produced by, for example, solution blending, melt mixing, or compounding in a shear mixer. Solution blending is common for making adhesive formulations comprising baled butyl rubber, tackifier, and oil. Then, the solution blend is coated on a fabric substrate, and the solvent evaporated to leave the adhesive.

The term "monomer" or "comonomer," as used herein, can refer to the monomer used to form the polymer (i.e., the unreacted chemical compound in the form prior to polymerization) and can also refer to the monomer after it has been incorporated into the polymer, also referred to herein as a "[monomer]-derived unit".

As used herein, when a polymer is referred to as "comprising, consisting of, or consisting essentially of" a monomer or monomer-derived units, the monomer is present in the polymer in the polymerized/derivative form of the monomer. For example, when a copolymer is said to have a "cyclopentene" content of 35 wt % to 55 wt %, it is understood that the mer unit in the copolymer is derived from cyclopentene in the polymerization reaction and said derived units are present at 35 wt % to 55 wt %, based upon the weight of the copolymer. Use of the term "cyclopentene ring-opening rubber" indicates that the cyclopentene is incorporated into the polymer chain after ring opening of the cyclopentene to form polypentenamers as opposed to polycyclopentene, where the cyclic cyclopentene unit is incorporated into the polymer as a cyclic unit.

The mol ratio of first cyclic olefin comonomer-derived units to second cyclic olefin comonomer-derived units is determined using $^1$H NMR where the different chemical shift of a hydrogen atom can be associated with each comonomer. Then, the relative intensity of the NMR associated with said hydrogens provides a relative concentration of each of the comonomers.

The ratio of cis to trans in a polymer is determined by $^{13}$C NMR using the relevant olefinic resonances. A carbon in a cis configuration has a smaller NMR chemical shift than a carbon in a trans configuration. The exact chemical shift will depend on the other atoms the carbon is bonded to and a configuration of such bond, but by way of non-limiting example, 1-ethyl-3,4-dimethylpyrrolidine-2,5-dione has cis carbon atoms with a $^{13}$C chemical shift of about 12.9 ppm for trans carbons and a $^{13}$C chemical shift of about 11.2 ppm for cis carbons. Then, the relative intensity of the NMR associated with said cis and trans carbons provides a relative concentration of each of the comonomers.

Unless otherwise indicated, NMR spectroscopic data of polymers are recorded in a 10 mm tube on a cryoprobe with a field of at least 600 MHz NMR spectrometer at 25° C. using deuterated chloroform (CDCl$_3$) solvent to prepare a solution with a concentration of 30 mg/mL for $^1$H NMR and 67 mg/mL for $^{13}$C NMR. Unless otherwise indicated, $^1$H NMR is recorded using a 300 flip angle RF pulse, 512 transients, with a delay of 5 seconds between pulses. Unless otherwise indicated, $^{13}$C NMR is recorded using a 90° pulse, inverse gated decoupling, a 60 second delay, and 512 transients. Samples are referenced to the residual solvent signal of CDCl$_3$ at 77.16 ppm for $^{13}$C and 7.26 ppm for $^1$H. Assignments for DCPD (dicyclopentadiene) composition and cis/trans ratio were based on Benjamin Autenrieth, et. al. (2015) "Stereospecific Ring-Opening Metathesis Polymerization (ROMP) of endo-Dicyclopentadiene by Molybdenum and Tungsten Catalysts," *Macromolecules*, v. 48, pp. 2480-2492. Assignments for cyclopentene (cC5) compositions and cis/trans ratio are based on Dounis et. al. (1995) "Ring-Opening Metathesis Polymerization of Monocyclic Alkenes using Molybdenum and Tungsten Alkylidene (Schrock-Type) Initiators and $^{13}$C Nuclear Magnetic Resonance Studies of the Resulting Polyalkenamers," *Polymer*, v. 36(14), pp. 2787-2796, and cC5-DCPD copolymer assignments were based on Dragutan, V. et. al. (2010) *Green Metathesis Chemistry: Great Challenges in Synthesis, Catalysis, and Nanotechnology*, pp. 369-380. Appearances of the DCPD units in the polymer chain are uniform enough that there is no observable blockiness.

For example, mol % DCPD is calculated from $^1$H NMR using the aliphatic region: DCPD (H4) at 3.22 ppm, cC5= $(I_{5\text{-}3\ ppm}-8*DCPD)/6$; DCPD*100/(cC5+DCPD)=mol %, mol % cC5 is 1-DCPD or cC5*100/(DCPD+cC5).

cC5 cis/trans ratio is determined from $^{13}$C NMR of the vinylene double bond region with the trans peak at 130.47 ppm and cis centered at 129.96 ppm. DCPD and norbornene (NBE) contribution to the region was considered negligible.

DCPD cis/trans ratio is determined from $^{13}$C NMR of the C$_2$ and C$_5$ peaks per FIG. 1 combined with trans at 47-45.5 ppm and cis at 42.2-41.4 ppm. Both values divided by 2 due to 2 carbons. % Trans=trans*100/(trans+cis) and vice versa.

Figure 2:
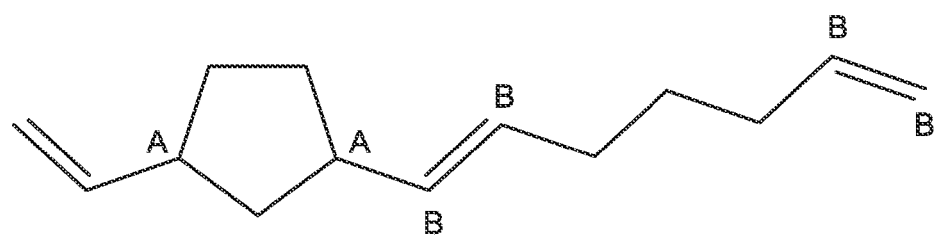
FIG. 2 (FIG. 2) is a copolymer with $^1$H NMR assignments for determining the mol % NBE.

Mol % norbornene (NBE) is calculated from $^1$H NMR using the aliphatic region per FIG. 2 where A and B's designations: NBE (A) at 2.88 ppm, NBE (mol %)=100* $(I_A/(I_B+I_A))$.

Mn is the number average molecular weight, Mw is the weight average molecular weight, and Mz is the z average molecular weight. Molecular weight distribution (MWD), also referred to as PDI (polydispersity index), is defined to be Mw divided by Mn. Unless otherwise noted, all molecular weight units (e.g., Mw, Mn, Mz) are reported in units of g/mol, Da, or kDa (1 g/mol=1 Da and 1,000 g/mol=1 kDa).

Gel Permeation Chromatography (GPC): Unless otherwise indicated, the molecular weight distribution, molecular weight moments (Mw, Mn, Mw/Mn) and long chain branching indices are determined by using a PolymerChar GPC-IR hyphenated with multi-angle light scattering detector (LS), viscometer and differential refractive index (DRI) detector. Three Agilent PLgel 10 μm Mixed-B LS columns were used for the GPC tests herein. The nominal flow rate is 0.5 mL/min, and the nominal injection volume is 200 μL. The columns, viscometer and DRI detector are contained in ovens maintained at 40° C. The tetrahydrofuran (THF) solvent with 250 ppm antioxidant butylated hydroxyltoluene (BHT) is used as the mobile phase. The polymer samples are weighed and sealed in standard vials. After loading the vials in the auto sampler, polymers are automatically dissolved in the instrument with 8 mL added THF solvent at 40° C. for about two hours with continuous shaking. The concentration, c, at each point in the chromatogram is calculated from the baseline-subtracted DRI signal, $I_{DRI}$, using the following equation:

$$c = K_{DRI} I_{DRI}/(dn/dc),$$

where $K_{DRI}$ is a constant determined by calibrating the DRI, and (dn/dc) is the incremental refractive index of polymer in THF solvent.

The conventional molecular weight is determined by combining universal calibration relationship with the column calibration, which is performed with a series of monodispersed polystyrene (PS) standards ranging from 300 g/mole to 12,000,000 g/mole. The molecular weight "M" at each elution volume was calculated with following equation:

$$\log M = \frac{\log(K_{PS}/K)}{a+1} + \frac{a_{PS}+1}{a+1}\log M_{PS}$$

where the variables with subscript stand or polystyrene while those without a subscript are for the test samples. In this method, $a_{PS}=0.7362$ and $K_{PS}=0.0000957$ while "a" and "K" for the samples were 0.676 and 0.000521, respectively.

The LS molecular weight, M, at each point in the chromatogram is determined by analyzing the LS output using the Zimm model for static light scattering and determined using the following equation:

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, "c" is the polymer concentration determined from the DRI analysis, $A_2$ is the second virial coefficient, $P(\theta)$ is the form factor for a mono-disperse random coil, and $K_o$ is the optical constant for the system, as set forth in the following equation:

$$K_o = \frac{4\pi^2 n^2 (dn/dc)^2}{\lambda^4 N_A},$$

where $N_A$ is Avogadro's number, and (dn/dc) is the incremental refractive index for the system, which takes the same value as the one obtained from the DRI method, and the value of "n" is 1.40 for THF at 40° C. and λ=665 nm. For the samples used in this test, the dn/dc is measured as 0.1092 by DRI detector.

A four capillaries viscometer with a Wheatstone bridge configuration was used to determine the intrinsic viscosity [η] from the measured specific viscosity (ηs) and the concentration "c."

$$\eta_s = c[\eta] + 0.3(c[\eta])^2.$$

The average intrinsic viscosity, $[\eta]_{avg}$, of the sample was calculated using the following equation:

$$[\eta]_{avg} = \frac{\sum c_i [\eta]_i}{\sum c_i},$$

where the summations are over the chromatographic slices, i, between the integration limits.

The branching index ($g'_{vis}$ or simply g') is defined as the ratio of the intrinsic viscosity of the branched polymer to the intrinsic viscosity of a linear polymer of equal molecular weight. The branching index g' is defined mathematically as:

$$g' = \frac{[\eta]_{avg}}{kM_v^a}.$$

The $M_v$ is the viscosity-average molecular weight based on molecular weights determined by LS analysis. The Mark-Houwink parameters, a and k, used for the reference linear polymer are 0.676 and 0.000521, respectively.

All the concentration is expressed in $g/cm^3$, molecular weight is expressed in g/mole, and intrinsic viscosity is expressed in dL/g unless otherwise noted.

Differential Scanning Calorimetry (DSC) was used to determine the glass transition temperature (Tg) and the melt temperature (Tm) of the polymer according to ASTM D3418-03. DSC data was obtained using a TA Instruments model Q200 machine. Samples weighing approximately from 5 mg to 10 mg were placed an aluminum sample pan and hermetically sealed. The samples were heated to 200° C. at a rate of 10° C./minute and thereafter, held at 200° C. for 2 minutes. The samples were subsequently cooled to −150° C. at a rate of 10° C./minute and held isothermally for 2 minutes at −150° C. A second heating cycle was then performed by heating to 200° C. at 10° C./minute. Tg and Tm are based on the second heating cycle.

As used herein, "phr" means "parts per hundred parts rubber," where the "rubber" is the total rubber content of the composition. Herein, both NR and CPR are considered to contribute to the total rubber content, such that in compositions where both are present, the "total rubber" is the combined weight of NR and CPR. Thus, for example, a composition having 40 parts by weight of CPR and 60 parts by weight of NR may be referred to as having 40 phr CPR and 60 phr NR. Other components added to the composition are calculated on a phr basis. For example, addition of 50 phr of oil to a composition means that 50 g of oil are present in the composition for every 100 g of CPR and NR combined. Unless specified otherwise, phr should be taken as phr on a weight basis.

The phase or loss angle δ, is the inverse tangent of the ratio of G" (the shear loss modulus) to G' (the shear storage modulus). For a typical linear polymer, the phase angle at low frequencies (or long times) approaches 90° because the chains can relax in the melt, adsorbing energy and making G" much larger than G'. As frequencies increase, more of the chains relax too slowly to absorb energy during the shear oscillations, and G' grows relative to G". In contrast, a branched chain polymer relaxes very slowly even at temperatures well above the melting temperature of the polymer, because the branches need to retract before the chain backbone can relax along its tube in the melt. This polymer never reaches a state where all its chains can relax during a shear oscillation, and the phase angle never reaches 90° even at the lowest frequency, w, of the experiments. These slowly relaxing chains lead to a higher zero shear viscosity. Long relaxation times lead to a higher polymer melt strength or elasticity.

The term "tan δ", also referred to as tangent delta, is used for describing a compound's behavior under forced vibration (e.g., when a motion is sinusoidal). Particularly, tan δ is the ratio between G" (the shear loss modulus) and G' (the shear storage modulus), tan δ=G"/G'. The tan δ value is dependent to the temperature.

As used herein, "tensile strength" means the amount of stress applied to a sample to break the sample. It can be expressed in Pascals or pounds per square inch (psi). ASTM D412-16 is used to determine tensile strength of a polymer.

"Mooney viscosity" as used herein is the Mooney viscosity of a polymer or polymer composition. The polymer composition analyzed for determining Mooney viscosity should be substantially devoid of solvent. For instance, the sample may be placed on a boiling-water steam table in a hood to evaporate a large fraction of the solvent and unreacted monomers, and then, dried in a vacuum oven overnight (12 hours, 90° C.) prior to testing, in accordance with laboratory analysis techniques, or the sample for testing may be taken from a devolatilized polymer (i.e., the polymer post-devolatilization in industrial-scale processes). Unless otherwise indicated, Mooney viscosity is measured using a Mooney viscometer according to ASTM D1646-17, but with the following modifications/clarifications of that procedure. First, sample polymer is pressed between two hot plates of a compression press prior to testing. The plate temperature is 125° C.+/−10° C. instead of the 50° C.+/−5° C. recommended in ASTM D1646-17, because 50° C. is unable to cause sufficient massing. Further, although ASTM D1646-17 allows for several options for die protection, should any two options provide conflicting results, PET 36 micron should be used as the die protection. Further, ASTM D1646-17 does not indicate a sample weight in Section 8; thus, to the extent results may vary based upon sample weight, Mooney viscosity determined using a sample weight of 21.5 g+/−2.7 g in the D1646-17 Section 8 procedures will govern. Finally, the rest procedures before testing set forth in D1646-17 Section 8 are 23° C.+/−3° C. for 30 minutes in air; Mooney values as reported herein were determined after resting at 24° C.+/−3° C. for 30 minutes in air. Samples are placed on either side of a rotor according to the ASTM D1646-17 test method; torque required to turn the viscometer motor at 2 rpm is measured by a transducer for determining the Mooney viscosity. The results are reported as Mooney Units (ML, 1+4 at 125° C.), where M is the Mooney viscosity number, L denotes large rotor (defined as ML in ASTM D1646-17), 1 is the pre-heat time in minutes, 4 is the sample run time in minutes after the motor starts, and 125° C. is the test temperature. Thus, a Mooney viscosity of 90 determined by the aforementioned method would be reported as a Mooney viscosity of 90 MU (ML, 1+4 at 125° C.). Alternatively, the Mooney viscosity may be reported as 90 MU; in such instance, it should be assumed that the just-described method is used to determine such viscosity, unless otherwise noted. In some instances, a lower test temperature may be used (e.g., 100° C.), in which case Mooney is reported as Mooney Viscosity (ML, 1+4 at 100° C.), or at T° C. where T is the test temperature.

The compression set of a material is a permanent deformation remaining after release of a compressive stress. The compression set of a material is dependent of the crosslinking density of the material, which is defined as the torque difference between a maximum torque (also referred to as "MH") and a minimum torque (also referred to as "ML"). MH, ML, and the torque difference "MH-ML" are evaluated by a Moving Die Rheometer (MDR) testing method, a standard testing method of rubber curing. The MDR can be measured by the ASTM D5289 method, often reported in deciNewton meter (dN·m).

Numerical ranges used herein include the numbers recited in the range. For example, the numerical range "from 1 wt % to 10 wt %" includes 1 wt % and 10 wt % within the recited range.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" or "having" various components or steps, the compositions and methods can also "consist essentially of" or "consist of" the various components and steps.

Rubber Compounds and Compounding

Rubber compounds described herein comprise:

a) 5 phr to 100 phr (or 10 phr to 95 phr, or 15 phr to 80 phr, or 20 phr to 75 phr, or 30 phr to 70 phr) of a CPR having: i) a ratio of cis to trans of 30:70 to 10:90 (or 20:80 to 10:90, or 15:85 to 10:90), and ii) a Tg of −120° C. to −80° C. (or −110° C. to −85° C., or −100° C. to −90° C.);

b) 0 phr to 95 phr of a rubber selected from a group consisting of a NR, a BR, and a combination thereof, wherein the rubber has a ratio of cis to trans of 70:30 to 100:0 (75:15 to 95:15, or 80:20 to 90:10, or 85:15);

c) 10 phr to 110 phr (or 20 phr to 100 phr, or 30 phr to 90 phr, or 40 phr to 60 phr, or 45 phr to 55 phr) of a reinforcing filler, d) 0.5 phr to 40 phr (or 1 phr to 30 phr, or 2 phr to 20 phr, or 4 phr to 10 phr) of a process oil; and e) optionally 0.1 to 20 phr curatives (such as stearic acid, zinc oxide, sulfur, n-cyclohexyl-2-benzothiazole sulfonamide, and diphenyl guanidine);

f) optionally additional additives.

Rubber compounds described herein can comprise a single CPR or a mixture of two or more CPRs (e.g., a dual reactor product or a melt blended composition).

The CPR may be present in the rubber compound at 5 phr to 100 phr, or 10 phr to 95 phr, or 15 phr to 80 phr, or 20 phr to 75 phr, or 30 phr to 70 phr. LCB-CPR compositions are described further below.

Optionally, the rubber is NR and is present in the rubber compound at 0 phr to 95 phr, or 5 phr to 90 phr, or 10 phr to 80 phr, or 15 phr to 70 phr, or 20 phr to 60 phr, or 30 phr to 50 phr. Alternatively, the NR may be present in the rubber compound at 50 phr to 100 phr, or 70 phr to 100 phr, or 60 phr to 100 phr, or 70 phr to 100 phr. NR compositions are described further below.

Optionally, the rubber is BR and is present in the rubber compound at 0 phr to 95 phr, or 5 phr to 90 phr, or 10 phr to 80 phr, or 15 phr to 70 phr, or 20 phr to 60 phr, or 30 phr to 50 phr. Alternatively, the BR may be present in the rubber compound at 50 phr to 100 phr, or 70 phr to 100 phr, or 60 phr to 100 phr, or 70 phr to 100 phr. BR compositions are described further below.

The reinforcing fillers may be present in the rubber compound at 30 phr to 90 phr, or 35 phr to 85 phr, or 40 phr to 80 phr. Reinforcing fillers are described further below. Examples of reinforcing fillers include, but are not limited to, carbon black and mineral reinforcing fillers (such as silica).

Carbon black reinforcing fillers (e.g., having particle size from 20 nm to 600 nm and structure having a iodine absorption number within the range from 0 gI/kg to 150 gI/kg, as measured by the ASTM D1510 test method) maybe present in the rubber compound from 30 phr to 90 phr, preferably 35 phr to 85 phr, preferably 40 phr to 80 phr.

Mineral reinforcing fillers (such as talc, calcium carbonate, clay, silica, aluminum trihydrate, and the like) may be present in the rubber compound from 30 phr to 90 phr, preferably 35 phr to 85 phr, preferably 40 phr to 80 phr.

The CPRs of the present disclosure exhibit a strong affinity to the reinforcing fillers, particularly to the carbon black reinforcing filler, which improves the wet traction while maintaining the roll resistance, as compared to the blends comprising NR/BR. Further, silica-filled rubber compounds typically exhibit improved wet traction but poor dry traction, when compared to carbon-filled rubber compounds. The present disclosure provides a carbon-filled rubber compounds comprising CPR with improved wet traction and similar or better rolling loss when compared to rubber compounds without LCPR present in the formulation.

The present disclosure provides a silica-filled rubber compounds comprising CPR with improved wet traction and similar or better rolling loss when compared to rubber compounds without CPR present in the formulation.

The process oil may be present in the rubber compound at 0.5 phr to 20 phr, or 1 phr to 15 phr, or 2 phr to 10 phr, or 4 phr to 8 phr.

Process oil, such as naphthenic base oil having a very low aromatic content and low paraffin (also referred to as "wax") content (any suitable examples of naphthenic base oils including NYTEX™ 4700 is a high viscosity naphthenic black oil (NBO) (available from Nynas).

The rubber compounds described herein may also include additives that may include, but are not limited to, curatives (such as vulcanization activators/agents/accelerators, cross-linking agents), coupling agents, plasticizers, compatibilizers, and the like, and any combination thereof.

Suitable vulcanization activators include zinc oxide (ZnO), stearic acid, sulfur, CBS (n-cyclohexyl-2-benzothiazole sulfonamide) and DPG (diphenyl guanidine) and the like. These activators may be mixed in amounts ranging from 0.1 phr to 20 phr. Different vulcanization activators may be present in different amounts. For instance, where the vulcanization activator includes zinc oxide, the zinc oxide may be present in an amount from 1 phr to 20 phr, such as from 2.0 phr to 10 phr, such as about 2.5 phr, for example, while stearic acid may preferably be employed in amounts ranging from 0.1 phr to 5 phr, such as from 0.1 phr to 2 phr, such as about 1 phr, for example).

Any suitable vulcanizing agent may be used. Of particular note are curing agents as described in Col. 19, line 35 to Col. 20, line 30 of U.S. Pat. No. 7,915,354, which description is hereby incorporated by reference (e.g., sulfur, peroxide-based curing agents, resin curing agents, silanes, and hydrosilane curing agents). The resin curing agent would enable further tuning of the rubber compound viscoelasticity and improve the material strength. Example of suitable silanes may be Silane X 50-S™, which is a blend of a bi-functional sulfur-containing organosilane Si 69™ (bis(triethoxysilylpropyl)tetrasulfide)) and an N330 type carbon black in the ratio 1:1 by weight. Other examples include phenolic resin curing agents (e.g., as described in U.S. Pat. No. 5,750,625, also incorporated by reference herein). Cure co-agents may also be included (e.g., zinc dimethacrylate (ZDMA)) or those described in the already-incorporated description of U.S. Pat. No. 7,915,354).

Further additives may be chosen from any known additives useful for rubber compounds, and include, among others, one or more of:

Vulcanization accelerators: compositions of the present disclosure can comprise 0.1 phr to 15 phr, or 1 phr to 5 phr, or 2 phr to 4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zinc dibutyldithiocarbamate, thioureas such as 1,3-diethylthiourea, thiophosphates and others;

Processing aids (e.g., polyethylene glycol or zinc soap);

Where foaming may be desired, sponge or foaming grade additives, such as foaming agent or blowing agent, particularly in very high Mooney viscosity embodiments, such as those suitable for sponge grades. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Suitable examples are described in U.S. Pat. Nos. 6,582,633 and 3,615,972, WIPO Publication Nos. WO 1999/046320 and WO 1999/043758, and contents of which hereby are incorporated by reference. Examples of such thermo-expandable microspheres include EXPANCEL™ products commercially available from Akzo Nobel N.V., and ADVANCELL™ products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants (e.g., 1,2-dihydro-2,2,4-trimethylquinoline; SANTOFLEX™ 6PPD), wax antiozonant (e.g., NOCHEK™ 4756A), stabilizers, anticorrosion agents, UV absorbers, antistatics, slip agents, moisture absorbents (e.g., calcium oxide), pigments, dyes or other colorants.

Rubber compounds of the present disclosure may be formed by combining the CPR, the rubber selected from a group consisting of a NR, a BR, and a combination thereof, the reinforcing filler, the processing oil, and additional additives, as needed, using any suitable method known in the polymer processing art. For example, a rubber compound may be made by blending the CPR, the rubber selected from a group consisting of a NR, a BR, and a combination thereof, the reinforcing filler, the processing oil, and additional additives, as needed, in solution and generally removing the blend. The components of the blend may be blended in any order.

In at least one instance, a method for preparing a rubber compound of the CPR and the rubber selected from a group consisting of a NR, a BR, and a combination thereof, includes contacting in a first reactor a ROMP catalyst with cyclic monomer(s) (e.g., cC5 and optional diene, such as norbornene and or cyclopentadiene) to form a CPR described herein. The method further includes preparing a solution of the rubber selected from a group consisting of a NR, a BR, and a combination thereof (either commercially available or formed in situ by using any suitable method for the production of the rubber selected from a group consisting of a NR, a BR, and a combination thereof). Methods can include transferring the CPR to the second reactor or the rubber selected from a group consisting of a NR, a BR, and a combination thereof, to the first reactor and recovering from the second reactor or the first reactor, respectively, a mixture of the CPR and the rubber selected from a group consisting of a NR, a BR, and a combination thereof. The recovered rubber compound may then be crosslinked, for example, as described in more detail below.

Alternatively, a blend may be prepared by combining CPR, the rubber selected from a group consisting of a NR, a BR, and a combination thereof from their respective reactions and mixed, for example, in a production extruder, such as the extruder on an injection molding machine or on a continuous extrusion line.

In another example, the method of blending the rubber polymers including CPR and rubber selected from a group consisting of a NR, a BR, and a combination thereof, may be to melt-blend the polymers in a batch mixer, such as a BANBURY™ or BARBENDER™ mixer. Blending may include melt blending the CPR, the rubber selected from a group consisting of a NR, a BR, and a combination thereof in an extruder, such as a single-screw extruder or a twin-screw extruder. Suitable examples of extrusion technology for polymer blends can be described in more detail in *Plastics Extrusion Technology*, F. Hensen, Ed. (Hanser, 1988), pp. 26-37, and in *Polypropylene Handbook*, E. P. Moore, Jr. Ed. (Hanser, 1996), pp. 304-348, which are incorporated herein by reference.

The CPR and the rubber selected from a group consisting of a NR, a BR, and a combination thereof, may also be blended by a combination of methods including, but not limited to, solution blending, melt mixing, compounding in a shear mixer and combinations thereof. For example, dry blending followed by melt blending in an extruder, or batch mixing of some components followed by melt blending with other components in an extruder. The CPR and the rubber selected from a group consisting of a NR, a BR, and a combination thereof, may also be blended using a double-cone blender, ribbon blender, or other suitable blender, or in a FARREL CONTINUOUS MIXER™ (FCM™).

The CPR, the rubber selected from a group consisting of a NR, a BR, and a combination thereof, the reinforcing filler, the processing oil, and optionally additional additives (e.g., curatives, crosslinking agents (or crosslinkers), plasticizers, compatibilizers, and the like) may be blended in varying orders, which in some instances may alter the properties of the resultant composition.

For example, a master batch that comprises the CPR and the rubber selected from a group consisting of a NR, a BR, and a combination thereof, and additives (except curatives and crosslinking agents) may be produced at a first temperature. Then, the curatives and/or crosslinking agents may be mixed into the master batch at a second temperature that is lower than the first temperature.

In another example, the master batch may be produced by mixing together in one-step the CPR and the rubber selected from a group consisting of a NR, a BR, and a combination thereof, and the additives (except curatives and crosslinking agents) until the additives are incorporated (e.g., producing a homogeneous blend). This is referred to herein as a first pass method or first pass blending. After the first pass blending produces the master batch, the curatives and/or crosslinking agents may be mixed into the master batch to produce the final blend.

In yet another example, a two-step mixing process may be used to produce the master batch. For example, the master batch may be produced by mixing the CPR with the additives (except curatives and crosslinking agents) until the additives are incorporated into the CPR (e.g., producing a homogeneous blend). Then, the resultant blend is mixed with the rubber selected from a group consisting of a NR, a BR, and a combination thereof, and the curatives and/or crosslinking agents. This is referred to herein as a second pass method or a second pass blending. Alternatively, the curatives and/or crosslinking agents may be mixed into the master batch after addition of the rubber selected from a group consisting of a NR, a BR, and a combination thereof, in the second pass to produce the final blend.

In some second pass blendings, mixing the CPR/additive (except curatives and crosslinking agents) blend with the rubber selected from a group consisting of a NR, a BR, and a combination thereof, may be done in mixer or other suitable system without removing the CPR/additive blend from the mixer (i.e., first pass blending) to produce the master batch. Alternatively, the CPR/additive (except curatives and crosslinking agents) blend may be removed from a mixer or other suitable system for producing the blend, and, then, mixed with the rubber selected from a group consisting of a NR, a BR, and a combination thereof, in a mixer or other suitable system (i.e., second pass blending) to produce the master batch.

For example, method for preparing a rubber compound of the CPR, the rubber selected from a group consisting of a NR, a BR, and a combination thereof, and one or more reinforcing fillers includes mixing one or more reinforcing fillers through at least a two stages of mixing. For example, when the reinforcing filler is carbon black, the carbon black-filled rubber compound may go through two stages of mixing. In another example, when the reinforcing filler is silica, the silica-filled composition may go through three stages of mixing.

In embodiments where curatives (e.g., crosslinking agents or vulcanizing agents) are present in a rubber compound, the CPRs and the rubber selected from a group consisting of a NR, a BR, and a combination thereof of the rubber compound may be present in at least partially crosslinked form (that is, at least a portion of the polymer chains are crosslinked with each other, e.g., as a result of a curing process). Accordingly, particular embodiments provide for an at least partially crosslinked rubber compound made by mixing (in accordance with any of the above-described methods for polymer blends) a rubber compound comprising: (a) a CPR (e.g., present at 5 phr to 100 phr, or 10 phr to 95 phr, or 15 phr to 80 phr, or 20 phr to 75 phr, or 30 phr to 70 phr) having a Tg of −120° C. to −80° C. (or −110° C. to −85° C., or −100° C. to −90° C.), and a ratio of cis to trans of 30:70 to 10:90 (or 20:80 to 10:90, or 15:85 to 10:90); (b) a rubber selected from a group consisting of a NR, a BR, and a combination thereof (e.g., present at 0 phr to 95 phr, or 5 phr to 90 phr, or 10 phr to 80 phr, or 15 phr to 70 phr, or 20 phr to 60 phr, or 30 phr to 50 phr, alternately at 50 phr to 100 phr), wherein the rubber has a ratio of cis to trans of 70:30 to 100:0 (75:15 to 95:15, or 80:20 to 90:10, or 85:15); (c) a reinforcing filler (e.g., present at 30 phr to 90 phr, or 35 phr to 85 phr, or 40 phr to 80 phr); (d) a process oil (e.g., present at 0.5 phr to 20 phr, or 1 phr to 15 phr, or 2 phr to 10 phr); (e) vulcanization activators, vulcanizing agents, and/or crosslinking agents; and optionally (f) further additives.

The rubber compounds described herein preferably comprise CPR; one or more rubbers selected from the group consisting of NR, BR (such as high vinyl BR), and combinations thereof; silica reinforcing filler; and curative such as Stearic acid, ZnO, Sulfur, CBS, DPG; and optional silica coupling agents, such as Si69™ (Evonik, bis(triethoxysilyl-propyl)tetrasulfide), Si266™ (Evonik, (bis(triethoxysilyl-propyl)disulfide), and/or Silane X 50-S™ (Evonik, 1:1 blend of bis(triethoxysilylpropyl)tetrasulfide and N330 carbon black).

The rubber compounds described herein (e.g., comprising CPR, the rubber selected from a group consisting of a NR, a BR, and a combination thereof, the reinforcing filler, the processing oil, and optionally additional additives) may have a cross-linking density (MH-ML) after curing at 160° C., 0.5° for 45 minutes of 5 dN·M to 25 dN·M, or 12.5 dN·M to 22.5 dN·M, or 13 dN·M to 20 dN·M.

The rubber compounds described herein (e.g., comprising CPR, the rubber selected from a group consisting a NR, a BR, or a combination thereof, the reinforcing filler, the processing oil, and optionally additional additives) may have a wet skid resistance (tan δ at −10° C., strain at 0.20%) of 0.1 to 0.5, or 0.12 to 0.4, or 0.14 to 0.3.

The rubber compounds described herein (e.g., comprising CPR, the rubber selected from a group consisting of a NR, a BR, and a combination thereof, the reinforcing filler, the processing oil, and optionally additional additives) may have a wet skid resistance (tan δ at 0° C., strain at 2.0%) of 0.05 to 0.5, or 0.07 to 0.4, or 0.1 to 0.3.

The rubber compounds described herein (e.g., comprising CPR, the rubber selected from a group consisting of a NR, a BR, and a combination thereof, the reinforcing filler, the processing oil, and optionally additional additives) may have a wear loss (tan δ at 60° C., strain at 2.0%) of 0.1 to 0.35, or 0.12 to 0.32, or 0.14 to 0.3.

The rubber compounds described herein (e.g., comprising CPR, the rubber selected from a group consisting of a NR, a BR, and a combination thereof, the reinforcing filler, the processing oil, and optionally additional additives) may have a tire handling (G' at 60° C., strain at 2.0%) of 5 MPa to 8 MPa, or 5.5 MPa to 7.5 MPa, or 6 MPa to 7 MPa.

The rubber compounds described herein (e.g., comprising CPR, the NR and/or BR, the reinforcing filler, the processing oil, and optionally additional additives) may have a DIN abrasion weight loss of 0.05 g to 0.25 g, or 0.06 g to 0.22 g, or 0.07 g to 0.20 g.

The rubber compounds described herein (e.g., comprising CPR, the rubber selected from a group consisting of a NR, a BR, and a combination thereof, the reinforcing filler, the processing oil, and optionally additional additives) may have a hardness (Shore A) of 55 to 75, or 57.5 to 72.5, or 60 to 70, or 62.5 to 67.5.

The rubber compounds described herein (e.g., comprising CPR, the rubber selected from a group consisting a NR, a BR, and a combination thereof, the reinforcing filler, the processing oil, and optionally additional additives) may have a tensile stress at 300% elongation (300% Modulus) at room temperature of 10 MPa to 14 MPa, or 10.2 MPa to 13 MPa, or 10.4 MPa to 12 MPa.

The rubber compounds described herein (e.g., comprising CPR, the rubber selected from a group consisting of a NR, a BR, and a combination thereof, the reinforcing filler, the processing oil, and optionally additional additives) may have a tensile at break (Tb) of 15% to 30%, or 16% to 29%, or 17% to 28%, or 18% to 27%, or 17% to 26%, or 15% to 25%.

The rubber compounds described herein (e.g., comprising CPR, the rubber selected from a group consisting a NR, a BR, or a combination thereof, the reinforcing filler, the processing oil, and optionally additional additives) may have an elongation at break (Eb) of 400% to 600%, or 410% to 590%, or 420% to 580%, or 430% to 570%, or 440% to 560%, or 450% to 550%.

Cyclopentene Ring Opening Rubber

Rubber compounds described herein may comprise: 5 phr to 100 phr (or 10 phr to 95 phr, or 15 phr to 80 phr, or 20 phr to 75 phr, or 30 phr to 70 phr) of a CPR having a Tg of −120° C. to −80° C. (or −110° C. to −85° C., or −100° C. to −90° C.) and a ratio of cis to trans of 40:60 to 5:95 (30:70 to 10:90, or 20:80 to 10:90, or 15:85 to 10:90).

Rubber compounds described herein can comprise a single CPR or a mixture of two or more CPR (e.g., a dual reactor product or blended CPRs).

The CPR may be a homopolymer of a ring opened cyclopentene monomers. Alternatively, the CPR may be a branched cyclic olefin copolymer produced from ring opened cyclopentene and one or more comonomers (such as diene comonomers) at a mol ratio of a cyclopentene to the comonomers (cumulatively) of 1:1 to 500:1 (or 5:1 to 250:1, 1:1 to 100:1, 1:1 to 10:1, 5:1 to 50:1, 50:1 to 250:1, or 100:1 to 500:1).

Examples of comonomers include, but are not limited to, cyclooctene, 1,5-cyclooctadiene, 1-hydroxy-4-cyclooctene, 1-acetoxy-4-cyclooctene, 5-methylcyclopentene, dicyclopentadiene (DCPD), norbornene (NBE), norbornadiene, vinyl norbornene, ethylidene norbornene, cycloheptene, cyclohexene, cyclohexadiene, cyclododecene, cyclododecadiene, 7-oxanorbornene, 7-oxanorbornadiene, cis-5-norbornene-endo-2,3-dicarboxylic anhydride, dimethyl norbornene carboxylate, and norbornene-exo-2,3-carboxylic anhydride.

Cyclic olefins suitable for use as comonomers in the methods of the present disclosure may be strained or unstrained (preferably strained); monocyclic or polycyclic (e.g., bicyclic); and optionally include heteroatoms and/or one or more functional groups.

Alternately, the CPR may have long chain branching (LCB) characterized by a branching index ($g'_{vis}$) of 0.50 to 0.91 (or 0.50 to 0.8, or 0.60 to 0.8, or 0.70 to 0.91), which is sometimes obtained when a diene (such as a diene capable of having two polymerizable dienes) is included in the cyclopentene monomer feed.

The CPRs of the present disclosure may have a melting temperature of less than 35° C., such as less than 20° C., such as less than 10° C., such as 5° C. to 35° C., or 7° C. to 30° C., or 10° C. to 20° C.

The CPRs of the present disclosure may have a Mw of 1 kDa to 1,000 kDa, or 10 kDa to 1,000 kDa, or 100 kDa to 1,000 kDa, or 250 kDa to 750 kDa, or 250 kDa to 550 kDa.

The CPRs of the present disclosure may have a Mn of 0.5 kDa to 500 kDa, or 1 kDa to 250 kDa, or 10 kDa to 250 kDa, or 50 kDa to 250 kDa, or 100 kDa to 500 kDa.

The CPRs of the present disclosure may have a MWD (Mw/Mn) of 1 to 10, or greater than 1 to 10, or 1 to 5, or greater than 1 to 5 or 2 to 4, or 1 to 3, or greater than 1 to 3.

The CPRs of the present disclosure may have a trans content of 50% or more, alternately 60% or more, alternately 70% or more, alternately 80% or more, alternately 90% or more. Alternately the CPRs of the present disclosure may have from 50 to 100% trans content, alternately from 60 to 95% trans content, alternately from 70 to 90% trans content, alternately from 75 to 90% trans content.

The CPRs of the present disclosure may have long chain branching. The long chain branching (LCB) can be qualitatively characterized by the analysis of the van Gurp-Palmen (vGP) plot according to the method described by Trinkle et al. (2002) Rheol. Acta, v. 41, pg. 103. The vGP plot is a plot of the loss angle versus the magnitude of the complex modulus (|G*|) measured by dynamic oscillatory rheology in the linear viscoelastic regime. A linear polymer is characterized by a monotonic decreasing dependence of the loss angle with |G*| in the vGP plot and a long chain branched polymer has a shoulder or a minimum in the vGP plot.

The CPRs of the present disclosure having a long chain branching structure may have a δ at a G* of 50 kPa of 30° to 60°, or 30° to 50°, or 30° to 40°. Polymers of the present disclosure having a linear structure may have a δ at a G* of 50 kPa of 65° to 80°, or 70° to 80°, or 700 to 75°.

The CPRs of the present disclosure may be produced by ring-opening metathesis polymerization (ROMP).

Metathesis Catalyst Compounds and Polymerization of CPRs

Catalysts suitable for use in conjunction with the methods described herein are any catalysts capable of performing ROMP. For example, the catalyst is a tungsten or ruthenium metal complex-based metathesis catalyst.

In embodiments according to the instant invention, a process to form a cyclic olefin polymerization catalyst comprises:

i) contacting a metal alkoxide (IIIa) with a transition metal halide (IV) to form a transition metal precatalyst (VIIIa) according to the general formula:

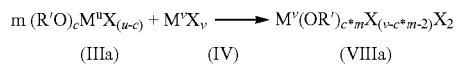

$$m\,(R'O)_cM^uX_{(u-c)} + M'X_v \longrightarrow M^v(OR')_{c*m}X_{(v-c*m-2)}X_2$$
$$(IIIa) \qquad (IV) \qquad (VIIIa)$$

ii) contacting the transition metal precatalyst (VIIIa) with a metal alkyl activator (A) to form the activated catalyst comprising a transition metal carbene moiety $M^v=C(R^*)_2$ according to the general formula:

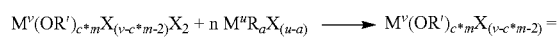

$$M^v(OR')_{c*m}X_{(v-c*m-2)}X_2 + n\,M^uR_aX_{(u-a)} \longrightarrow M^v(OR')_{c*m}X_{(v-c*m-2)} =$$
$$(VIIIa) \qquad (A) \qquad (V)$$
$$C(R^*)_2$$

wherein $M^u$ is a Group 1, 2, or 13 metal of valance u, preferably Li, Na, Ca, Mg, Al, or Ga;
c is from 1 to 3 and ≤u;
m=⅓, ½, 1, 2, 3, or 4 and c*m≤v−2;
a is 1, 2, or 3 and a≤u;
n is a positive number but a*n is in between 2 to 10;
$M^v$ is a Group 5 or 6 transition metal of valance v;
X is halogen,
each R' is independently a monovalent hydrocarbyl comprising from 1 to 20 atoms selected from Groups 14, 15, and 16 of the periodic table;
each R is independently a $C_1$ to $C_8$ alkyl;
each R* is independently H or a $C_1$ to $C_7$ alkyl; and
each Z is independently halide or a $C_1$ to $C_8$ alkyl radical.

Accordingly, embodiments described herein may include Group 1 and Group 2 mono-alkoxides (e.g., Li(OR') or Mg(OR')X), Group 2 metal and Group 13 metal dialkoxides (e.g., Mg(OR')$_2$ and Al(OR')$_2$X), and Group 13 trialkoxide (e.g., Al(OR')$_3$), wherein R' is independently a monovalent hydrocarbyl comprising from 1 to 20 atoms selected from Groups 14, 15, and 16 of the periodic table, and X is halogen. In any embodiment, metal alkoxide (IIIa) may comprise (a) a Group 1 metal, e.g., NaOR' (u=1, c=1, d=0); (b) a Group 2 metal, e.g., Mg(OR')Cl (u=2, c=1, d=1), or Mg(OR')$_2$ (u=2, c=2, u=0); or (c) a Group 13 metal, e.g., Al(OR')Cl$_2$ (u=3, c=1, d=2), Al(OR')$_2$Cl (u=3, c=2, d=1), or Al(OR')$_3$ (u=3, c=3, d=0).

In embodiments of the invention, the metal alkoxide (IIIa) is formed by contacting a compound comprising a hydroxyl functional group (I) with a Group 1 or Group 2 metal hydride $M^{u*}(H)_u$ according to the general formula:

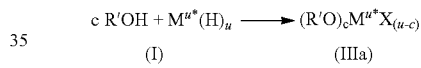

$$c\,R'OH + M^{u*}(H)_u \longrightarrow (R'O)_cM^{u*}X_{(u-c)}$$
$$(I) \qquad\qquad (IIIa)$$

wherein $M^{u*}$ is a Group 1 or 2 metal of valance u*, preferably Na, Li, Ca, or Mg;
c is 1 or 2 and c is ≤u*;
X is halogen; and
each R' is independently a monovalent hydrocarbyl comprising from 1 to 20 atoms selected from Groups 14, 15, and 16 of the periodic table.

In embodiments of the invention, the metal alkoxide (IIIa) is formed by contacting a compound comprising a hydroxyl functional group (I) with the metal alkyl activator (A) to form the metal alkoxide IIIa according to the general formula:

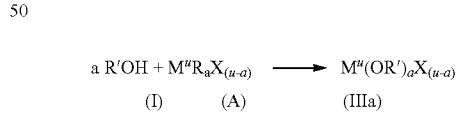

$$a\,R'OH + M^uR_aX_{(u-a)} \longrightarrow M^u(OR')_aX_{(u-a)}$$
$$(I) \qquad (A) \qquad (IIIa)$$

wherein each R' is independently a monovalent hydrocarbyl comprising from 1 to 20 atoms selected from Groups 14, 15, and 16 of the periodic table;
$M^u$ is a Group 1, 2, or 13 metal of valance u, preferably Li, Na, Ca, Mg, Al, or Ga; a is 1, 2, or 3; a is ≤u; and
each R is independently a $C_1$ to $C_8$ alkyl.

In embodiments of the invention, the process further comprises contacting a mixture of metal alkoxides with one or more ligand donors (D) under conditions sufficient to crystalize and isolate the metal alkoxide (IIIa) as one or more dimeric coordinated metal alkoxide-donor composition according to the general structure (XXV-GD$_2$):

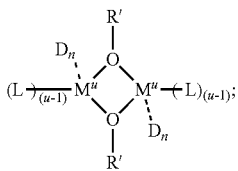

(XXV-GD₂)

wherein $M^u$ is a Group 1, 2, or 13 metal of valance u, preferably Li, Na, Ca, Mg, Al, or Ga;

each R' is independently a monovalent hydrocarbyl comprising from 1 to 20 atoms selected from Groups 14, 15, and 16 of the periodic table;

each L is R'O—, alkyl R as defined for structure A, or halide X;

each D is any O or N containing organic donor selected from ethers (e.g., dialkyl ethers, cyclic ethers), ketones, amines (e.g., trialkyl amines, aromatic amines, cyclic amines, and heterocyclic amines (e.g., pyridine)), nitriles (e.g., alkyl nitriles and aromatic nitriles), and any combination thereof (preferably, tetrahydrofuran, methyl-tertbutyl ether, a $C_1$-$C_4$ dialkyl ether, a $C_1$-$C_4$ trialkyl amine, and any combination thereof); and n is 1, 2, 3, or 4.

In embodiments of the invention, a process to form a cyclic olefin polymerization catalyst comprises contacting an alkyl-metal alkoxide (IIIb) with a transition metal halide (IV) in a reaction mixture to form the activated catalyst (V) comprising a transition metal carbene moiety $M^v=C(R^*)_2$ according to the general formula:

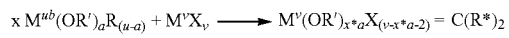

wherein $M^{ub}$ is a Group 2 or 13 metal of valance u, preferably Ca, Mg, Al, or Ga, most preferably Al;

a is 1 or 2 but <u;

x is ½ or 1, 2, 3, or 4 but x*a< or =v−2;

$M^v$ is a Group 5 or 6 transition metal of valance v;

X is halogen;

each R' is independently a monovalent hydrocarbyl comprising from 1 to 20 atoms selected from Groups 14, 15, and 16 of the periodic table;

each R is independently a $C_1$ to $C_8$ alkyl; and each R* is independently H or a $C_1$ to $C_7$ alkyl.

In embodiments of the invention, the reaction mixture further comprises a metal alkyl activator (A) according to the formula $M^uR_aX_{(u-a)}$, wherein M is a Group 1, 2, or 13 metal of valance u, preferably Li, Na, Ca, Mg, Al, or Ga; a is 1, 2, or 3; a<u; and when present, X is halogen.

In embodiments of the invention, $M^v$ is W, Mo, Nb, or Ta. In some embodiments, two or more R'O— ligands are connected to form a single bidentate chelating moiety.

In one or more embodiments of the invention, a process to form a cyclic olefin polymerization catalyst comprises: (i) and (iia) or (i), (iib1), and (iib2):

i) contacting a compound comprising a hydroxyl functional group (I) with an alkyl aluminum compound (II) to form an aluminum precatalyst (III) and the corresponding residual (Q1+Q2) according to the general formula:

wherein m is 1 or 2;

a is 1 or 2;

each Z is independently H or a $C_1$ to $C_8$ alkyl;

each R' is independently a monovalent hydrocarbyl comprising from 1 to 20 atoms selected from Groups 14, 15, and 16 of the periodic table; and each Y is a $C_1$ to $C_8$ alkyl, halogen, or an alkoxy hydrocarbyl moiety represented by —$OR^5$, wherein each $R^5$ is a $C_1$ to $C_{20}$ alkyl radical and wherein Y=$C_1$ to $C_8$ alkyl;

iia) contacting the aluminum precatalyst (III) with a transition metal halide (IV) to form an activated carbene containing cyclic olefin polymerization catalyst (V) comprising a transition metal carbene moiety $M^v=C(R^*)_2$ according to the general formula:

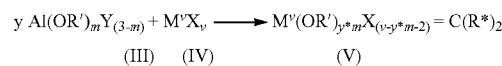

wherein each R* is independently H or a $C_1$ to $C_7$ alkyl; or iib1) contacting the aluminum precatalyst (III) with a transition metal halide (IV) to form a transition metal precatalyst, (VIII) according to the general formula:

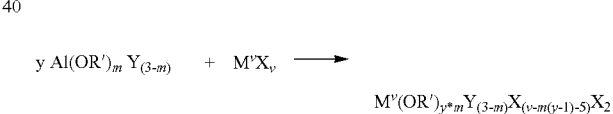

wherein m=1, 2, or 3; y=⅓, ½, 1, 2, 3, or 4; y*m+3−m≤v−2; and iib2) contacting the transition metal precatalyst, (VIII) with a metal alkyl activator (A) to form the activated carbene containing cyclic olefin polymerization catalyst (V) comprising a transition metal carbene moiety $M^v=C(R^*)_2$ according to the general formula:

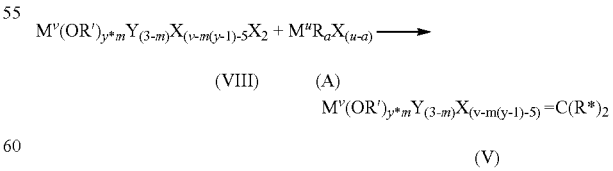

wherein R* is a hydrogen or $C_1$-$C_7$ alkyl.

Embodiments in which R* is $C_1$-$C_7$ alkyl are preferred because activators in which R* is an alkyl having 8 or more carbon atoms are not capable of directly activating the transition metal halide.

In one or more embodiments of the invention wherein a=3 such, the alkyl aluminum compound (II) is a trialkylaluminum (IX) and the residual is an alkane HR according to the general formula:

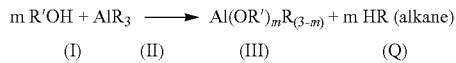

wherein m=1 or 2; and each R is independently a $C_1$ to $C_8$ alkyl radical.

In embodiments of the process, the aluminum precatalyst (III) is a dimer represented by structure (III-D) which is reacted with the transition metal halide (IV) to form the activated carbene containing cyclic olefin polymerization catalyst (V) according to the general formula:

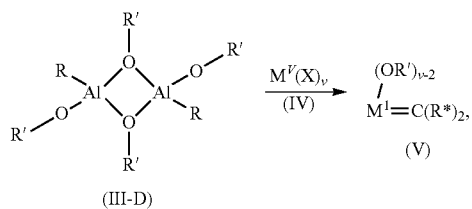

wherein each R is $C_1$ to $C_8$ alkyl; each R* is independently hydrogen or $C_1$ to $C_7$ alkyl; and each R' is independently a monovalent hydrocarbyl comprising from 1 to 20 atoms selected from Groups 14, 15, and 16 of the periodic table, or two or more of R' are connected to form a bidentate chelating ligand.

In embodiments where a=2 and Y is halogen, the alkyl aluminum compound (II) is a dialkyl aluminum halide (VI), and the aluminum precatalyst is a di-halo tetrakis alkoxide aluminum dimer (VII) according to the general formula:

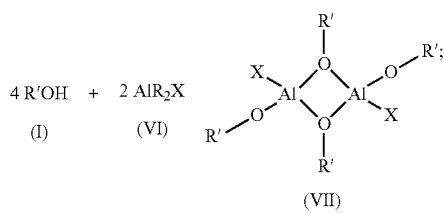

and
then, the di-halo tetrakis alkoxide aluminum dimer (VII) is contacted with the transition metal halide (IV) to form a di-halo transition metal precatalyst (VIII) according to the general formula:

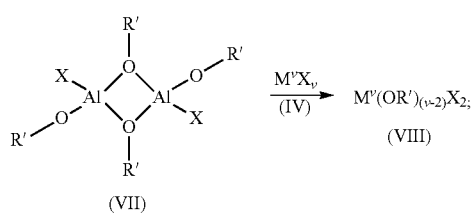

and
wherein the di-halo transition metal precatalyst (VIII) is contacted with a metal alkyl activator (A) to form the activated carbene containing cyclic olefin polymerization catalyst (V) according to the general formula:

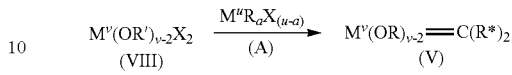

wherein a=1, 2, or 3; and a is ≤u.

In one or more embodiments of the invention, a molar ratio of $M^v$ to $M^u$-R in metal alkyl activator $M^u R_a X_{(u-a)}$ is from 1 to 2 to 1 to 15. In one or more embodiments the alkoxy ligand R'O— comprises a $C_7$ to $C_{20}$ aromatic moiety and wherein the O atom directly bonds to the aromatic ring; the compound comprising a hydroxyl functional group (I) is a bidentate dihydroxy chelating ligand (X'); the alkyl aluminum compound (II) is a dialkyl aluminum halide (VI), and the aluminum precatalyst (III) is an aluminum alkoxide mono-halide (XI) according to the general formula:

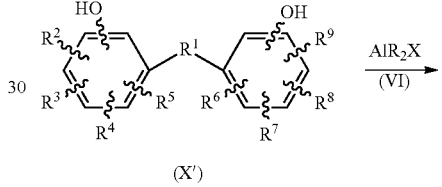

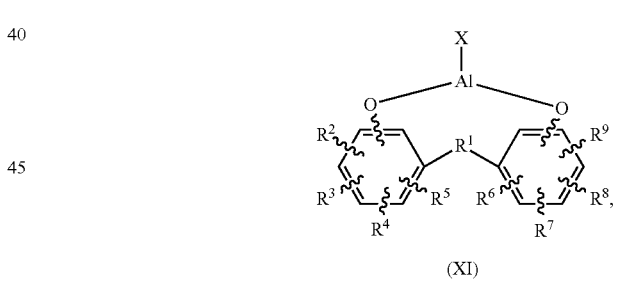

wherein $R^1$ is a direct bond between the two rings or a divalent hydrocarbyl radical comprising from 1 to 20 atoms selected from Groups 14, 15, and 16 of the periodic table; $R^2$ through $R^9$ are each independently a monovalent hydrocarbyl radicals comprising from 1 to 20 atoms selected from Groups 14, 15, and 16 of the periodic table, or two or more of $R^2$ through $R^9$ join together for form a ring having 40 or less atoms from Groups 14, 15, and/or 16 of the periodic table.

In one or more embodiments of the invention, the process may further comprise:

i) contacting two equivalents of the aluminum alkoxide mono-halide (XI) with the transition metal halide (IV) to form a transition metal halo bis-alkoxide catalyst precursor (XII) according to the general formula:

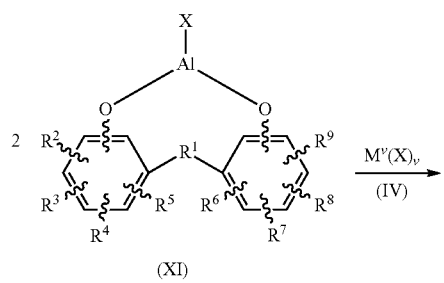

(XI)

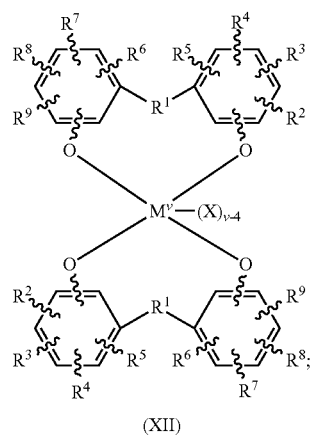

(XII)

and ii) contacting the transition metal halo bis-alkoxide catalyst precursor (XII) with a trialkyl aluminum compound (IX) to form the activated carbene containing cyclic olefin polymerization catalyst (XIII) according to the general formula:

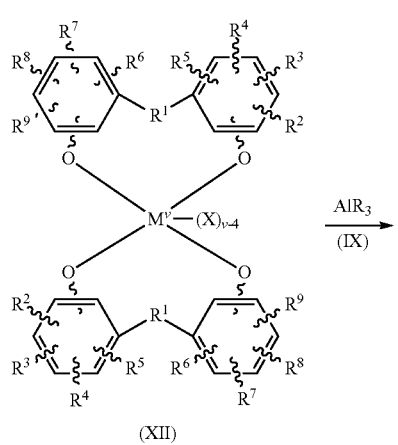

(XII)

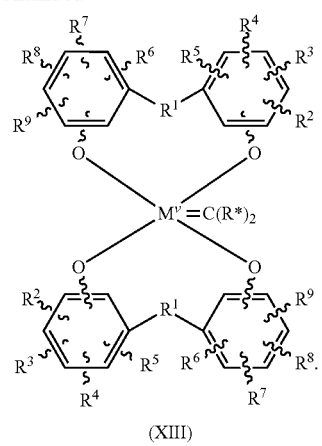

(XIII)

In other embodiments of the invention, the process may further comprise:

i) contacting one equivalent of the aluminum alkoxide mono-halide (XI) with a transition metal halide (IV) to form a transition metal halo alkoxide catalyst precursor (XIV) according to the general formula:

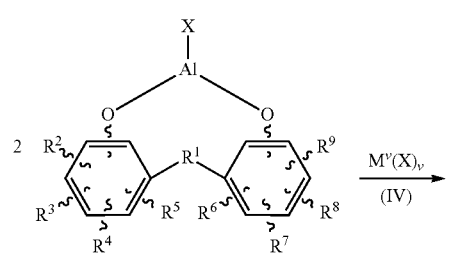

(XI)

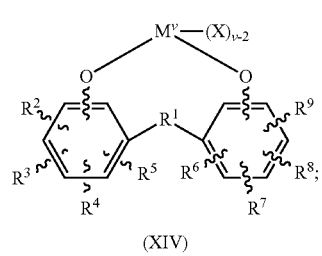

(XIV)

and ii) contacting the transition metal halo alkoxide catalyst precursor (XIV) with a trialkyl aluminum compound (IX) to form the activated carbene containing cyclic olefin polymerization catalyst (XV) according to the general formula:

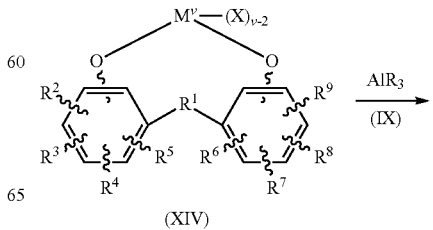

(XIV)

-continued

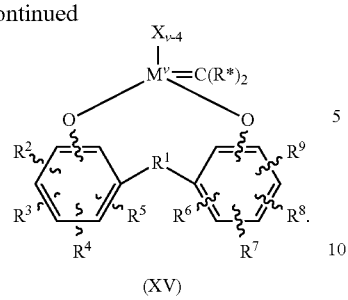

(XV)

In one or more embodiments of the process, the compound comprising a hydroxyl functional group (I) is a bidentate dihydroxy chelating ligand (X'); the alkyl aluminum compound (II) is a trialkyl aluminum (IX), and the aluminum precatalyst (III) is an alkyl aluminum alkoxide (XX) according to the general formula:

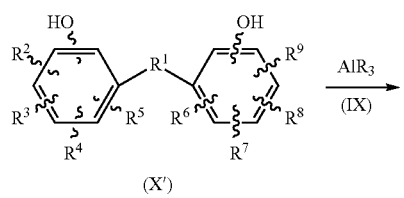

(X')

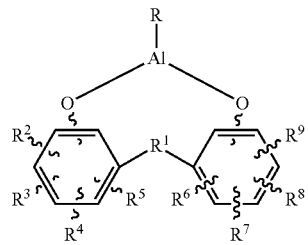

(XX)

wherein $R^1$ is a direct bond between the two rings or a divalent hydrocarbyl radical comprising from 1 to 20 atoms selected from Groups 14, 15, and 16 of the periodic table; $R^2$ through $R^9$ are each independently a monovalent hydrocarbyl radicals comprising from 1 to 20 atoms selected from Groups 14, 15, and 16 of the periodic table, or two or more of $R^2$ through $R^9$ join together for form a ring having 40 or less atoms from Groups 14, 15, and/or 16 of the periodic table.

In embodiments, the process further comprises contacting two equivalents of the aluminum-alkyl alkoxide (XX) with a transition metal halide (V) to form the activated carbene containing cyclic olefin polymerization catalyst (XXI) according to the general formula:

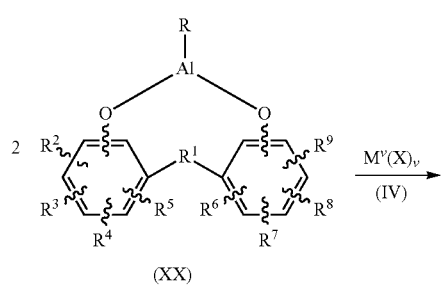

(XX)

-continued

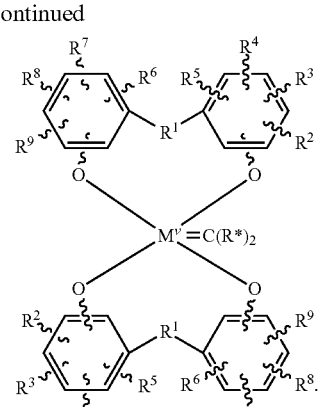

(XXI)

In embodiments of the invention, the process further comprises contacting one equivalent of the aluminum-alkyl alkoxide (XX) with a transition metal halide (V) to form the activated carbene containing cyclic olefin polymerization catalyst (XXIa) according to the general formula:

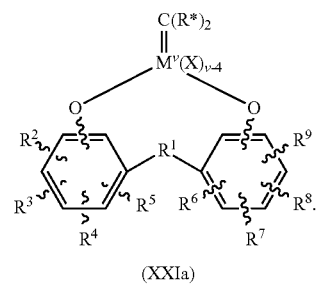

(XXIa)

In embodiments of the process, the compound comprising a hydroxyl functional group (I) is a mixture comprising a bidentate dihydroxy chelating ligand (X') and a monodentate hydroxy ligand (XVI); the alkyl aluminum compound (II) is a trialkyl aluminum (IX), and the aluminum precatalyst (HI) is an aluminum tri-alkoxide (XVII), the process further comprising:

i) forming the aluminum tri-alkoxide (XVII) according to the general formula:

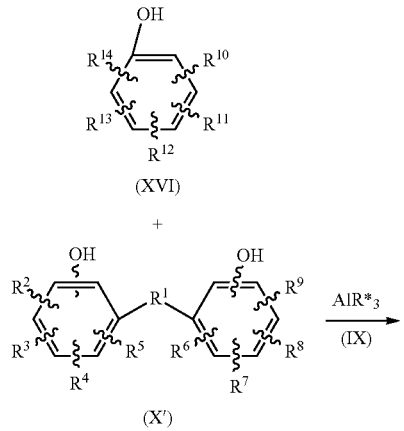

(XVI)

+

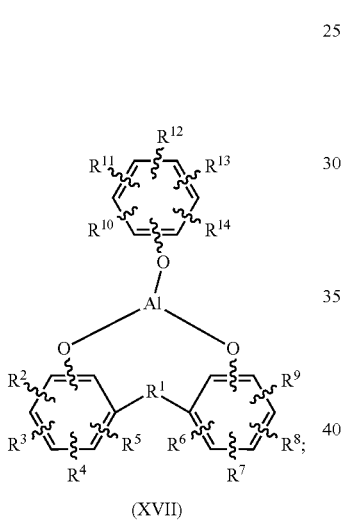

(X')

$\xrightarrow{\text{AlR*}_3 \text{ (IX)}}$

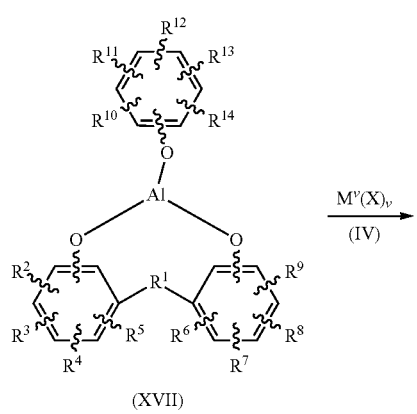

(XVII)

ii) contacting the aluminum tri-alkoxide (XVII) with a transition metal halide (IV) to form a transition metal alkoxide catalyst precursor (XVIII) according to the general formula:

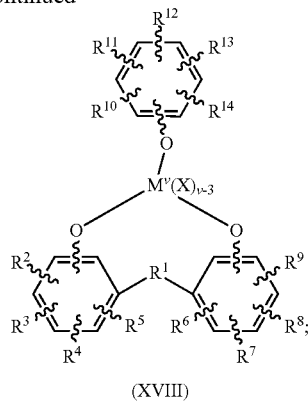

(XVII) $\xrightarrow{M^v(X)_v \text{ (IV)}}$ (XVIII)

and iii) contacting the transition metal alkoxide catalyst precursor (XVIII) with a trialkyl aluminum compound (IX) to form the activated carbene containing cyclic olefin polymerization catalyst (XIX) according to the general formula:

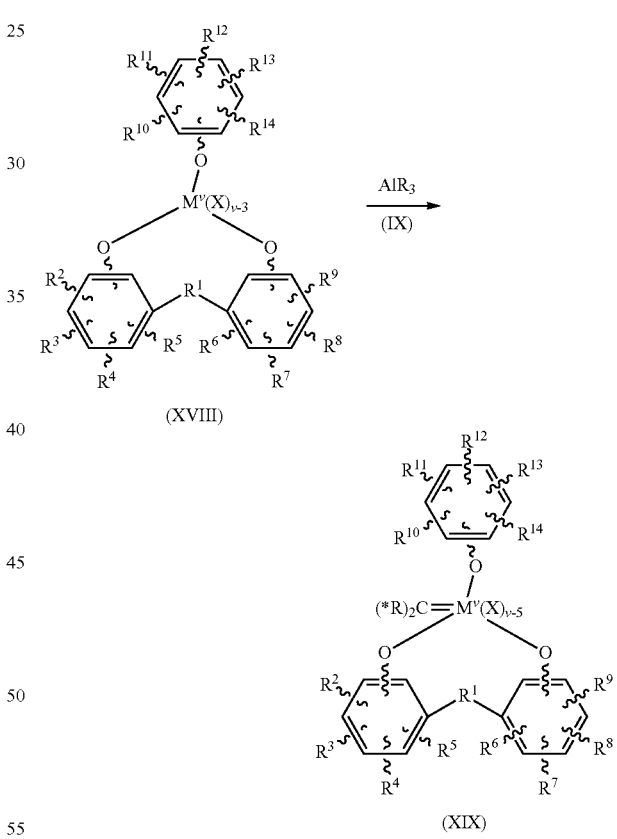

(XVIII) $\xrightarrow{\text{AlR}_3 \text{ (IX)}}$ (XIX)

wherein $M^v$ is a Group 5 or Group 6 transition metal of valance v; X is halogen; $R^1$ is a direct bond between the two rings of the bidentate ligand, or a divalent hydrocarbyl radical comprising from 1 to 20 atoms selected from Groups 14, 15, and 16 of the periodic table; each of $R^2$ through $R^{14}$ is independently, a hydrogen, a monovalent radical comprising from 1 to 20 atoms selected from Groups 14, 15, and 16 of the periodic table, a halogen, or two or more of $R^2$ through $R^9$ and/or two or more of $R^{10}$ through $R^{14}$ join together to form a ring comprising 40 atoms or less from Groups 14, 15, and 16 of the periodic table.

In embodiments of the invention, the compound comprising a hydroxyl functional group (I) is an aromatic compound comprising a phenoxy hydroxyl group Ar—OH (XXIV); the alkyl aluminum compound (II) is an alkyl aluminum halide, and the aluminum precatalyst (III) is a mixture of aluminum alkoxides (XXVa), (XXVb), and (XXVc), the process further comprising i) forming the mixture of aluminum alkoxides (XXVa), (XXVb), and (XXVc) according to the general formula:

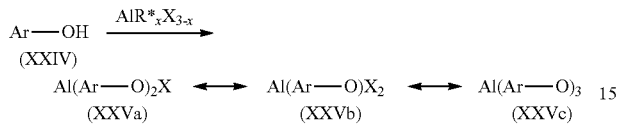

wherein x is from 1 to 2; and ii) contacting the mixture of metal alkoxides with one or more ligand donors (D) under conditions sufficient to crystalize and isolate the metal alkoxide (IIIa) as one or more dimeric coordinated metal alkoxide-donor composition according to the general structure (XXV-GD$_2$):

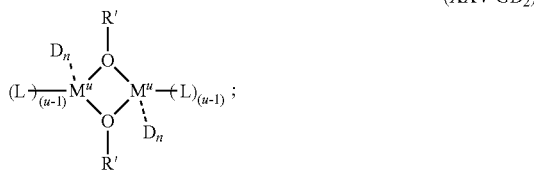

wherein $M^u$ is a Group 1, 2, or 13 metal of valance u, preferably Li, Na, Ca, Mg, Al, or Ga;

each R' is independently a monovalent hydrocarbyl comprising from 1 to 20 atoms selected from Groups 14, 15, and 16 of the periodic table;

each L is R'O—, alkyl R as defined for structure A, or halide X;

each D is any O or N containing organic donor selected from ethers (e.g., dialkyl ethers, cyclic ethers), ketones, amines (e.g., trialkyl amines, aromatic amines, cyclic amines, and heterocyclic amines (e.g., pyridine)), nitriles (e.g., alkyl nitriles and aromatic nitriles), and any combination thereof (preferably, tetrahydrofuran, methyl-tertbutyl ether, a $C_1$-$C_4$ dialkyl ether, a $C_1$-$C_4$ trialkyl amine, and any combination thereof); and n is 1, 2, 3, or 4.

Another example of catalysts suitable for use in conjunction with the methods described herein may include, but are not limited to:

(i) a catalyst represented by the (XXVI):

where M is a group 8 metal, preferably Os or Ru, preferably Ru;

X and $X^1$ are, independently, any anionic ligand, preferably a halogen (preferably chlorine), an alkoxide or a triflate, or X and $X^1$ may be joined to form a dianionic group and may form a single ring of up to 30 non-hydrogen atoms or a multinuclear-ring system of up to 30 non-hydrogen atoms;

L and $L^1$ are, independently, a neutral two electron donor, preferably a phosphine or a N-heterocyclic carbene, L and $L^1$ may be joined to form a single ring of up to 30 non-hydrogen atoms or a multinuclear-ring system of up to 30 non-hydrogen atoms;

L and X may be joined to form a multidentate monoanionic group and may form a single ring of up to 30 non-hydrogen atoms or a multinuclear-ring system of up to 30 non-hydrogen atoms;

$L^1$ and $X^1$ may be joined to form a multidentate monoanionic group and may form a single ring of up to 30 non-hydrogen atoms or a multinuclear-ring system of up to 30 non-hydrogen atoms; and $R^1$ and $R^2$ may be different or the same and may be hydrogen, substituted or unsubstituted alkyl, or substituted or unsubstituted aryl; and/or (ii) a catalyst represented by (XXVII):

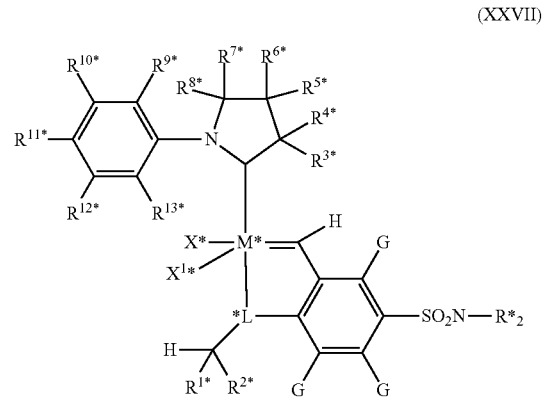

where M* is a Group 8 metal, preferably Ru or Os, preferably Ru;

X* and X1* are, independently, any anionic ligand, preferably a halogen (preferably chlorine), an alkoxide or an alkyl sulfonate, or X* and X1* may be joined to form a dianionic group and may form a single ring of up to 30 non-hydrogen atoms or a multinuclear-ring system of up to 30 non-hydrogen atoms;

L* is N—R, 0, P—R, or S, preferably N—R or O(R is a $C_1$ to $C_{30}$ hydrocarbyl or substituted hydrocarbyl, preferably methyl, ethyl, propyl or butyl);

R* is hydrogen or a $C_1$ to $C_{30}$ hydrocarbyl or substituted hydrocarbyl, preferably methyl;

$R^{1*}$, $R^{2*}$, $R^{3*}$, $R^{4*}$, $R^{5*}$, $R^{6*}$, $R^{7*}$, and $R^{8*}$ are, independently, hydrogen or a $C_1$ to $C_{30}$ hydrocarbyl or substituted hydrocarbyl, preferably methyl, ethyl, propyl or butyl, preferably $R^{1*}$, $R^{2*}$, $R^{3*}$, and $R^{4*}$ are methyl;

each $R^{9*}$ and $R^{13*}$ are, independently, hydrogen or a $C_1$ to $C_{30}$ hydrocarbyl or substituted hydrocarbyl, preferably a $C_2$ to $C_6$ hydrocarbyl, preferably ethyl;

$R^{10*}$, $R^{11*}$, $R^{12*}$ are, independently hydrogen or a $C_1$ to $C_{30}$ hydrocarbyl or substituted hydrocarbyl, preferably hydrogen or methyl;

each G, is, independently, hydrogen, halogen or $C_1$ to $C_{30}$ substituted or unsubstituted hydrocarbyl (preferably a $C_1$ to $C_{30}$ substituted or unsubstituted alkyl or a substituted or unsubstituted $C_4$ to $C_{30}$ aryl); and where any two adjacent R groups may form a single ring of up to 8 non-hydrogen atoms or a multinuclear-ring system of up to 30 non-hydrogen atoms; and/or (iii) a Group 8 metal complex represented by (XXVIII):

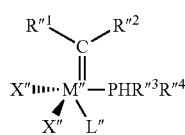

(XXVIII)

wherein M" is a Group 8 metal (preferably M is ruthenium or osmium, preferably ruthenium);

each X" is independently an anionic ligand (preferably selected from the group consisting of halides, alkoxides, aryloxides, and alkyl sulfonates, preferably a halide, preferably chloride);

$R''^1$ and $R''^2$ are independently selected from the group consisting of hydrogen, a $C_1$ to $C_{30}$ hydrocarbyl, and a $C_1$ to $C_{30}$ substituted hydrocarbyl (preferably $R''^1$ and $R''^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);

$R'''^3$ and $R'''^4$ are independently selected from the group consisting of hydrogen, $C_1$ to $C_{12}$ hydrocarbyl groups, substituted $C_1$ to $C_{12}$ hydrocarbyl groups, and halides (preferably $R'''^3$ and $R'''^4$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl); and L" is a neutral donor ligand, preferably L" is selected from the group consisting of a phosphine, a sulfonated phosphine, a phosphite, a phosphinite, a phosphonite, an arsine, a stibine, an ether, an amine, an imine, a sulfoxide, a carboxyl, a nitrosyl, a pyridine, a thioester, a cyclic carbene, and substituted analogs thereof; preferably a phosphine, a sulfonated phosphine, an N-heterocyclic carbene, a cyclic alkyl amino carbene, and substituted analogs thereof (preferably L" is selected from a phosphine, an N-heterocyclic carbene, a cyclic alkyl amino carbene, and substituted analogs thereof); and/or (iv) a Group 8 metal complex represented by (XXIX):

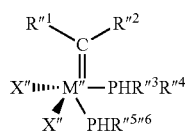

(XXIX)

wherein M" is a Group 8 metal (preferably M is ruthenium or osmium, preferably ruthenium);

each X" is independently an anionic ligand (preferably selected from the group consisting of halides, alkoxides, aryloxides, and alkyl sulfonates, preferably a halide, preferably chloride);

$R''^1$ and $R''^2$ are independently selected from the group consisting of hydrogen, a $C_1$ to $C_{30}$ hydrocarbyl, and a $C_1$ to $C_{30}$ substituted hydrocarbyl (preferably $R''^1$ and $R''^2$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl);

$R'''^3$, $R'''^4$, $R'''^5$, and $R'''^6$ are independently selected from the group consisting of hydrogen, $C_1$ to $C_{12}$ hydrocarbyl groups, substituted $C_1$ to $C_{12}$ hydrocarbyl groups, and halides (preferably $R'''^3$, $R'''^4$, $R'''^5$, and $R'''^6$ are independently selected from the group consisting of methyl, ethyl, propyl, isopropyl, butyl, tert-butyl, sec-butyl, pentyl, cyclopentyl, hexyl, cyclohexyl, heptyl, octyl, cyclooctyl, and substituted analogs and isomers thereof, preferably selected from the group consisting of tert-butyl, sec-butyl, cyclohexyl, and cyclooctyl).

Additional examples of catalysts suitable for use in conjunction with the methods described herein are available in U.S. Pat. No. 8,227,371 and US Patent Application Pub. Nos. US 2012/0077945 and US 2019/0040186, each of which is incorporated herein by reference. The catalysts may be zeolite-supported catalysts, silica-supported catalysts, and alumina-supported catalysts.

Two or more catalysts may optionally be used including combinations of the foregoing catalysts.

Optionally, an activator can be included with the catalyst. Examples of activators suitable for use in conjunction with the methods described herein include, but are not limited to, aluminum alkyls (e.g., triethylaluminum), organomagnesium compounds, and the like, and any combination thereof.

The reaction can be carried out as a solution polymerization in a diluent. Diluents for the methods described herein should be non-coordinating, inert liquids. Examples of diluents suitable for use in conjunction with the methods described herein may include, but are not limited to, straight and branched-chain hydrocarbons (e.g., isobutane, butane, pentane, isopentane, hexanes, isohexane, heptane, octane, dodecane, and mixtures thereof); cyclic and alicyclic hydrocarbons (e.g., cyclohexane, cycloheptane, methylcyclohexane, methylcycloheptane, and mixtures thereof such as ISOPAR™ (synthetic isoparaffins, commercially available from ExxonMobil Chemical Company)); perhalogenated hydrocarbons (e.g., perfluorinated $C_4$-$C_{10}$ alkanes, chlorobenzene, and aromatic); alkyl substituted aromatic compounds (e.g., benzene, toluene, mesitylene, and xylene); and the like, and any combination thereof.

The reaction mixture can include diluents at 60 vol % or less, or 40 vol % or less, or 20 vol % or less, based on the total volume of the reaction mixture.

Generally, quenching compounds that stop the polymerization reaction are antioxidants, which may be dispersed in alcohols (e.g., methanol or ethanol). Examples of quenching compounds may include, but are not limited to, butylated hydroxytoluene, IRGANOX™ antioxidants (available from BASF), and the like, and any combination thereof.

The quenching compounds can be added to the reaction mixture at 0.05 wt % to 5 wt %, or 0.1 wt % to 2 wt % based on the weight of the polymer product.

In the ROMP process, the preparation of the ROMP catalyst and/or the copolymerization may be carried out in an inert atmosphere (e.g., under a nitrogen or argon environment) to minimize the presence of air and/or water.

Further, the ROMP process may be carried out in a continuous reactor or batch reactors.

CPRs of the present disclosure may have a mol ratio of first cyclic olefin comonomer-derived units to second cyclic olefin comonomer-derived units of 3:1 to 100:1, or 4:1 to 75:1, or 5:1 to 50:1, or 6:1 to 35:1. As previously discussed, previous methods where the second cyclic olefin comonomer is added in full, the second cyclic olefin comonomer incorporates to a greater degree than the first cyclic olefin comonomer. Accordingly, incorporation of the first cyclic olefin comonomer to a degree greater than a 3:1, 4:1, 5:1, or especially a 6:1 mol ratio of first cyclic olefin comonomer-derived units to second cyclic olefin comonomer-derived units can be obtained.

High Vinyl Polybutadiene Rubber

High vinyl polybutadiene rubber is a polybutadiene rubber having a vinyl content of at least about 50% vinyl (i.e., at least about 50% of the double bonds in the polybutadiene will be of the 1,2-micro structure), alternately the polybutadiene rubber has a vinyl content of at least about 60%, alternately from 65% to 100%, alternately from 70% to 95%, alternately from 75% to 95%, alternately from 80% to 90%, as determined by $^{13}$C NMR.

In embodiments, high vinyl polybutadiene rubber has a glass transition temperature of 10° C. or less, typically from 10° C. to −40° C. (as determined by DSC).

In embodiments, high vinyl polybutadiene rubber has a melting temperature (Tm) of as determined by DSC of 10° C. or less, typically the Tm is undetectable.

In embodiments, high vinyl polybutadiene rubber has a weight average molecular weight (Mw) of 200,000 g/mol or more, such as 250,000 g/mol or more.

In embodiments, high vinyl polybutadiene rubber has:

1) a vinyl content of at least about 50% vinyl (i.e., at least about 50% of the double bonds in the polybutadiene will be of the 1,2-micro structure), alternately the polybutadiene rubber has a vinyl content of at least about 60%, alternately from 65% to 100%, alternately from 70% to 95%, alternately from 75% to 95%, alternately from 80% to 90%; and 2) a glass transition temperature of 10° C. or less, typically from 10° C. to −40° C., as determined by DSC;

3) a melting temperature (Tm) of as determined by DSC of 10° C. or less, or a Tm that is undetectable, as determined by DSC; and 4) a weight average molecular weight (Mw) of 200,000 g/mol or more, such as 250,000 g/mol or more, GPC.

Tire Tread Compositions

Passenger car tire treads can include one or more rubber compounds described herein that comprise: 40 phr to 70 phr (or 42.5 phr to 67.5 phr, or 45 phr to 65 phr, or 47.5 phr to 62.5 phr, or 50 phr to 60 phr) of a cyclopentene ring-opening rubber (CPR) having a glass transition temperature (Tg) of −120° C. to −80° C. (or −110° C. to −85° C., or −100° C. to −90° C.), and a ratio of cis to trans of 40:60 to 5:95 (30:70 to 10:90, or 20:80 to 10:90, or 15:85 to 10:90); 30 phr to 60 phr (or 32.5 phr to 57.5 phr, or 35 phr to 55 phr, or 37.5 phr to 52.5 phr, or 40 phr to 50 phr) of a styrene-butadiene rubber (SBR) having a Tg of −60° C. to −5° C. (or −50° C. to −5° C., or −40° C. to −10° C.); 50 phr to 110 phr (or 70 phr to 90 phr, or 73 phr to 87 phr, or 76 phr to 84 phr, or 78 phr to 82 phr) of a reinforcing filler; 20 phr to 50 phr (or 22 phr to 48 phr, or 24 phr to 46 phr, or 26 phr to 44 phr, or 28 phr to 42 phr, or 30 phr to 40 phr) of a process oil; and optionally additional additives.

Heavy-duty truck and bus tire treads can include one or more rubber compounds described herein that comprise: 5 phr to 100 phr (or 10 phr to 95 phr, or 15 phr to 80 phr, or 20 phr to 75 phr, or 30 phr to 70 phr) of a CPR having a Tg of −120° C. to −80° C. (or −110° C. to −85° C., or −100° C. to −90° C.), and a ratio of cis to trans of 40:60 to 5:95 (30:70 to 10:90, or 20:80 to 10:90, or 15:85 to 10:90); 0 phr to 95 phr of a rubber selected from a group consisting of a NR, a BR, and a combination thereof, wherein the rubber has a ratio of cis to trans of 70:30 to 100:0 (75:15 to 95:15, or 80:20 to 90:10, or 85:15); 30 phr to 90 phr (or 35 phr to 85 phr, or 40 phr to 80 phr) of a reinforcing filler; 0.5 phr to 20 phr (or 1 phr to 15 phr, or 2 phr to 10 phr) of a process oil; and optionally additional additives.

To form the rubber compounds in accordance with at least one embodiment of the present disclosure, the rubber compounds may be compounded or otherwise mixed according to suitable mixing methods; and molded into tire treads, wherein crosslinking and/or curing occurs per known methods and at known points during the method of forming the tire tread and/or related rubber compound.

Specific Embodiments

This invention further relates to:

1. A rubber compound for tire treads, comprising:
   30 to 70 phr of a cyclopentene ring-opening rubber having a glass transition temperature (Tg) of −120° C. to −80° C. and a ratio of cis to trans of 5:95 to 40:60; and
   20 phr to 60 phr of a high vinyl polybutadiene rubber having a vinyl content of at least about 50% vinyl.

2. The rubber compound of paragraph 1, further comprising 20 phr to 100 phr of a reinforcing filler.

3. The rubber compound of paragraph 1 or 2, further comprising 0.5 phr to 50 phr of a process oil.

4. The rubber compound of any of paragraphs 1 to 3, wherein the cyclopentene ring-opening rubber has a weight average molecular weight (Mw) of 1 kDa to 1,000 kDa, alternately 300 kDa to 500 kDa.

5. The rubber compound of any of paragraphs 1 to 4, wherein the cyclopentene ring-opening rubber has an Mw/Mn of 1 to 10.

6. The rubber compound of any of paragraphs 1 to 5, further comprising curative.

7. The rubber compound of any of paragraphs 1 to 6, wherein the cyclopentene ring-opening rubber has a melting temperature of 35° C. or less.

8. The rubber compound of any of paragraphs 1 to 7, wherein the rubber has a ratio of cis to trans of 30:70 to 10:90.

9. The rubber compound of any of paragraphs 1 to 8, further comprising reinforcing filler comprising silica, curative, and a silica coupling agent such as bis(triethoxysilylpropyl) tetrasulfide), (bis(triethoxysilylpropyl)disulfide), and/or 1:1 blend of bis(triethoxysilylpropyl)tetrasulfide and carbon black.

10. The rubber compound of any of paragraphs 1 to 9, wherein the rubber compound has a wet skid resistance (tan δ at −10° C., strain at 0.20%) of 0.10 to 0.5.

11. The rubber compound of any of paragraphs 1 to 10, wherein the rubber compound has a wet skid resistance (tan δ at 0° C., strain at 2.0%) of 0.2 to 0.5.

12. The rubber compound of any of paragraphs 1 to 11, wherein the rubber compound has a tensile stress at 300% elongation (300% Modulus) at room temperature of 10 MPa to 14 MPa.

13. The rubber compound of any of paragraphs 1 to 12, wherein the rubber compound has a tensile at break of 15 to 30 MPa and an elongation at break of 400% to 600%.

14. The rubber compound of any of paragraphs 1 to 13, further comprising reinforcing filler of carbon black, silica, or a mixture thereof.

15. The rubber compound of any of paragraphs 1 to 14, wherein the rubber compound has a wear loss (tan δ at 60° C., strain at 2.0%) of 0.2 to 0.35.

16. The rubber compound of any of paragraphs 1 to 15, wherein the rubber compound has a tire handling (G' at 60° C., strain at 2.0%) of 5 MPa to 8 MPa.

17. A method for making rubber compound for tire treads of any of the above paragraphs 1 to 16, comprising: compounding 5 to 100 phr of a cyclopentene ring-opening rubber having a glass transition temperature (Tg) of −120° C. to −80° C. and a ratio of cis to trans of 5:95 to 40:60; 20 phr to 60 phr of a high vinyl polybutadiene rubber having a vinyl content of at least about 50% vinyl; 30 phr to 90 phr of a reinforcing filler, 0.5 phr to 20 phr of a process oil; and 0.1 to 20 phr of curative.

18. The method of paragraph 17, wherein the rubber compound further comprises 0.1 phr to 15 phr of a vulcanizing agent and/or a crosslinking agent, and wherein the method further comprises at least partially crosslinking the rubber compound.

19. The method of paragraph 17 or 18, further comprising molding the rubber compound into a heavy-duty truck and bus tire tread.

20. The method of any of paragraphs 17 to 19, wherein the reinforcing filler comprises silica and the compound is crosslinked with curative and a silica coupling agent such as bis(triethoxysilylpropyl)tetrasulfide), (bis(triethoxysilylpropyl)disulfide), and/or 1:1 blend of bis(triethoxysilylpropyl) tetrasulfide and carbon black.

21. A tire tread made of rubber compound comprising:
   5 to 100 phr of a cyclopentene ring-opening rubber cyclopentene ring-opening rubber having a glass transition temperature (Tg) of −120° C. to −80° C. and a ratio of cis to trans of 5:95 to 40:60;
   20 phr to 60 phr of a high vinyl polybutadiene rubber having a vinyl content of at least about 50% vinyl;
   30 phr to 90 phr of a reinforcing filler;
   0.5 phr to 20 phr of a process oil; and
   0.1 to 20 phr of a curative.

22. The tire tread of paragraph 21, wherein the rubber compound is at least partially crosslinked.

23. The tire tread of paragraph 21 or 22, wherein the reinforcing filler comprises silica and the compound is crosslinked with curative and a silica coupling agent such as bis(triethoxysilylpropyl)tetrasulfide), (bis(triethoxysilylpropyl)disulfide), and/or 1:1 blend of bis(triethoxysilylpropyl) tetrasulfide and carbon black.

24. The tire tread of paragraph 21, 22 or 23, wherein tire tread has a depth of 3/32 inches to 32/32 inches.

To facilitate a better understanding of the embodiments of the present invention, the following examples of preferred or representative embodiments are given. In no way should the following examples be read to limit, or to define, the scope of the invention.

Examples

Various tire tread compounds were made and tested. The tire tread compounds were prepared in a BARBENDER™ mixer, employing a two-stage mixing procedure for preparation of compounds containing no filler (Ref 1 to Ref 4) or reinforced with carbon black of grade N234, or employing a three-stage mixing procedure for preparation of compounds reinforced with precipitated silica (Zeosil™ 1165MP).

After mixing, each compound was tested for cure behavior with a dynamic mechanical analyzer ATD™ 1000 (also called RPA™ from Alpha Technologies). The testing was at 150° C. (or at 160° C.) for 45 minutes (at 1.67 Hz & 7.0% strain).

For each compound, one tensile pad (3.0 inch by 6.0 inch, ~2.0 mm in thickness) was cured under high pressure in a mold heated at 150° C. (or at 160° C.) for $t_{c90}$+2 minutes. The $t_{c90}$ time was from the cure test for the corresponding compound. Each compound was then tested with the RPA™ for dynamic strain sweep at 1 Hz and 60° C. after curing at 150° C. (or at 160° C.) for $t_{c90}$+2 minutes.

Specimens were die-cut from the tensile pad for each compound for both dynamic temperature ramp testing with an Advanced Rheometric Expansion System (ARES™) from Rheometric Scientific, Inc. and tensile testing at RT. A rectangular strip was die-cut out of the cured tensile pad for dynamic temperature ramp testing at 10 Hz and at the heating rate of 2° C./min with an Advanced Rheometric Expansion System (ARES™) from Rheometric Scientific, Inc. Such testing employed a torsional rectangular geometry. The strain amplitude was at 0.20% below 0° C. while it was raised to 2.0% at and above 0° C. Six data points were collected per minute, and all tests ended at 100° C.

Micro-dumbbell specimens (according to ISO 37, Type III specimens) were employed for the tensile testing at RT. For most compounds, five specimens were tested for each compound. The values for mod 100%, mod 300%, tensile at break (Tb) and elongation at break (Eb) reported in the tables below were the average values for each quantity of a compound.

After die-cutting the tensile specimens, specimens were also cut from the tensile pads for measuring specific gravity for a cured compound at PTL. Specific gravity was tested following ASTM D792 Method A at 23° C.

To prepare the tire tread compounds, several different polymers and blends containing one or more polymers, with and without reinforcing fillers, were used. Various polymers are commercially available, including: solution SBR Nipol NS 116® from Zeon Elastomers; solution SBR Duradene 739™ from Firestone Polymers; high-cis BR Diene 140ND™ from Firestone Polymers which is reported to have a vinyl content of less than 32%; high-vinyl BR Europrene BR HV80™ from Versalis which is reported to have a vinyl content of 77 wt % and Tg of about −31° C.; and natural rubber of grade SIR 20. One or more additives were used, including SANTOFLEX® 6PPD an antioxidant; KADOX® 911 a zinc oxide reinforcing agent of high surface area used as a crosslinker, accelerator, and initiator; DPG (diphenyl guanidine) used as an accelerator/activator, and CBS (n-cyclohexyl-2-benzothiazole sulfonamide) used as a delayed action accelerator (medium to fast primary accelerator). The reinforcing filler was either N234 type carbon black or ZEOSIL™ 1165MP silica.

The cyclopentene ring-opening rubbers were HCP 54 and HCP 57. HCP 54 was made by adding 1.397 g (3.524 mmol) $WCl_6$ and 65 mL toluene at room temperature to a round bottom flask equipped with a magnetic stirrer and contained within an inert atmosphere glove box. Next, 2.092 g (7.031 mmol) (p-cresol)$_2$AlCl (containing 7% of toluene) was added, and the resulting mixture was stirred for 1 hour at room temperature. Meanwhile, to a sealed 4 L kettle reactor fitted with mechanical stirrer, which had been dried overnight and evacuated/refilled with Argon (×5), 600 g purified cyclopentene (previously treated by passing through a column packed with basic alumina) and 2.70 L anhydrous toluene were added via cannula transfer. The reaction kettle and contents were chilled to 0° C. using an external thermostatic bath, and then, 10.0 mL of a 1.00 M solution of $Et_3Al$ in hexane (10.0 mmol $Et_3A$) was injected into the reactor. The mixture was equilibrated for 20 minutes after $Et_3Al$ injection, and then with vigorous stirring of the kettle contents, the catalyst solution described above was added to the kettle via cannula transfer. The flask containing the catalyst solution and the cannula needle were washed with an additional 20 mL toluene to ensure quantitative transfer. Reaction progress was monitored by $^1$H NMR analysis of aliquots removed from the reactor at various times. The reaction was quenched at 18 hours (66% conv.) by the addition of a BHT solution prepared from 1.6 g BHT, 250 mL MeOH, and 450 mL toluene. The high-viscosity, gel-like reaction mixture was then precipitated into stirred MeOH (~8 L). The resulting polymer was spread onto aluminum foil in a fume hood, misted with a solution of BHT/MeOH (~3 g BHT) and allowed to dry for 3-4 days. The polymer was then dried for an additional 6 hours at 50° C. under vacuum. The polymer was then placed in a sealed glass jar.

HCP 57 was produced as follows: to a round bottom flask equipped with a magnetic stirrer and contained within an inert atmosphere glove box, were charged 1.941 g (4.895 mmol) WCl$_6$ and 100 mL toluene at room temperature. Next, 2.905 g (9.764 mmol) (p-cresol)$_2$AlCl (containing 7% of toluene) was added, and the resulting mixture was stirred for 1 hour at room temperature. Meanwhile, to a 10 L reactor fitted with mechanical stirrer, which had been evacuated/refilled (×5) with UHP-grade nitrogen followed by purging with UHP-grade nitrogen for 3 hours, 1,000 g purified cyclopentene (previously treated by passing through a column packed with basic alumina) and 4.5 L anhydrous toluene (from keg) were added via cannula transfer. The reaction kettle and contents were chilled to 0° C. (jacketed reactor) and allowed to equilibrate for 45 minutes. Then, 18.0 mL of a 1.00 M solution of Et$_3$A in hexane (18.0 mmol Et3Al) was injected into the reactor and allowed to stir for 20 minutes. With vigorous stirring, the catalyst solution described above was added to the reactor via cannula transfer, rinsing flask with 50 mL toluene to insure complete addition. The reaction was quenched at 48 hours, due to no further viscosity development, by the addition of a BHT solution prepared from 2.5 g BHT, 255 mL MeOH, and 560 mL toluene. The high-viscosity reaction mixture was then precipitated into stirred MeOH (~1 L/100 g CP). The resulting polymer was spread onto aluminum foil in a fume hood, misted with a solution of BHT/MeOH (~3 g BHT) and allowed to dry for 3-4 days. Thereafter, the polymer was dried in the vacuum oven for 6 hours at 50° C. The polymer was then placed in a sealed glass jar.

The cis/trans ratio was 20/80 for both HCP 54 and HCP 57. HCP 54 had an $M_w$ of 301,000 g/mol (GPC-DRI) and an Mw/Mn of 2.08 while HCP 57 exhibited an $M_w$ of 253,000 g/mol and an Mw/Mn of 1.95.

Single Rubber with No Filler

Four comparative examples (Ref 1 to Ref 4) made of a single polymer containing no filler were prepared according to the formulations shown in Table 1. "MB" refers to a master batch and "FB" refers to the final batch. The cure characteristics, tensile behavior, and specific gravity after curing for Ref. 1-4 are summarized in Table 2.

TABLE 1

| | Stock# | Ref 1 | Ref 2 | Ref 3 | Ref 4 |
|---|---|---|---|---|---|
| MB | SBR1 NS116R | 100 | 0 | 0 | 0 |
| | Diene 140ND (cis-BR) | 0 | 100 | 0 | 0 |
| | SIR20 (NR) | 0 | 0 | 100 | 0 |
| | CPR HCP57 | 0 | 0 | 0 | 100 |
| | Stearic acid | 2.5 | 2.5 | 2.5 | 2.5 |
| | Santoflex 6PPD | 2 | 2 | 2 | 2 |
| FB | Kadox 911 ZnO | 2 | 2 | 2 | 2 |
| | DPG | 1.4 | 1.4 | 1.4 | 1.4 |
| | CBS | 1.19 | 1.19 | 1.19 | 1.19 |
| | Sulfur | 1.4 | 1.4 | 1.4 | 1.4 |
| | Total (phr): | 110.49 | 110.49 | 110.49 | 110.49 |

TABLE 2

| Stock# | Ref 1 | Ref 2 | Ref 3 | Ref 4 |
|---|---|---|---|---|
| Polymer | SBR1 | cis-BR | NR | CPR |
| Cure testing | at 150° C., 0.5° C., for 45 min | | | |
| ML dN · m | 0.25 | 0.844 | 0.916 | 1.28 |
| MH dN · m | 5.217 | 10.158 | 5.823 | 13.47 |
| MH-ML dN · m | 4.967 | 9.314 | 4.907 | 12.19 |
| t$_{c90}$ min | 13.33 | 8.00 | 4.06 | 5.95 |
| Tensile RT | at 20 in/min | | | |
| Mod100% MPa | 0.725 | 1.191 | 0.904 | 1.487 |
| Mod200% MPa | 1.015 | 1.737 | 1.493 | N/A |
| Mod300% MPa | 1.387 | N/A | 2.339 | N/A |
| Tb MPa | 2.42 | 1.83 | 10.78 | 1.77 |
| Eb % | 433.74 | 213.5 | 523.28 | 159.86 |
| Energy at break J | 0.63096 | 0.34984 | 2.00269 | 0.25725 |
| Specific gravity at RT | 0.9543 | 0.9329 | 0.9421 | 0.9184 |

As shown in Table 2, Ref 4 made of CPR had the lowest value of specific gravity among the four compounds. The specific gravity of Ref 4 was 3.76% lower than that for Ref 1. (Reductions in the specific gravity mean that the end use material, on a volume basis, will weigh less.)

Single Rubbers Reinforced with Carbon Black or Silica

Eight comparative compounds made of a single polymer with filler were prepared according to the formulations shown in Table 3. Four comparative compounds (Ref 5 to Ref 8) were reinforced with carbon black while four comparative compounds (Ref 9 to Ref 12) were reinforced with precipitated silica.

TABLE 3

| | Compounds | Ref 5 | Ref 6 | Ref 7 | Ref 8 | Ref 9 | Ref 10 | Ref 11 | Ref 12 |
|---|---|---|---|---|---|---|---|---|---|
| MB: | SBR Duradene 739 | 100 | 0 | 0 | 0 | 100 | 0 | 0 | 0 |
| | cis-BR Diene 140ND | 0 | 100 | 0 | 0 | 0 | 100 | 0 | 0 |
| | Europrene BR HV80 | 0 | 0 | 100 | 0 | 0 | 0 | 100 | 0 |
| | CPR HCP54 | 0 | 0 | 0 | 100 | 0 | 0 | 0 | 100 |
| | Carbon black N234 | 80 | 80 | 80 | 80 | 0 | 0 | 0 | 0 |
| | silica Zeosil 1165MP | 0 | 0 | 0 | 0 | 80 | 80 | 80 | 80 |
| | Silane X 50-S | 0 | 0 | 0 | 0 | 12.80 | 12.80 | 12.80 | 12.80 |
| | Oil Sundex 8125 | 32.50 | 32.50 | 32.50 | 32.50 | 32.50 | 32.50 | 32.50 | 32.50 |
| | Stearic acid | 1.00 | 1.00 | 1.00 | 1.00 | 1.00 | 1.00 | 1.00 | 1.00 |
| | Nochek 4756A | 1.50 | 1.50 | 1.50 | 1.50 | 1.50 | 1.50 | 1.50 | 1.50 |
| | Santoflex 6PPD | 2.00 | 2.00 | 2.00 | 2.00 | 2.00 | 2.00 | 2.00 | 2.00 |
| | Kadox 911 ZnO | 2.50 | 2.50 | 2.50 | 2.50 | 2.50 | 2.50 | 2.50 | 2.50 |

TABLE 3-continued

|    | Compounds | Ref 5 | Ref 6 | Ref 7 | Ref 8 | Ref 9 | Ref 10 | Ref 11 | Ref 12 |
|---|---|---|---|---|---|---|---|---|---|
| FB: | DPG | 0.00 | 0.00 | 0.00 | 0.00 | 2.00 | 2.00 | 2.00 | 2.00 |
|    | CBS | 1.35 | 1.35 | 1.35 | 1.35 | 1.70 | 1.70 | 1.70 | 1.70 |
|    | Sulfur | 1.35 | 1.35 | 1.35 | 1.35 | 1.40 | 1.40 | 1.40 | 1.40 |
|    | Total (phr): | 222.20 | 222.20 | 222.20 | 222.20 | 237.40 | 237.40 | 237.40 | 237.40 |

The cure characteristics, specific gravity after curing, as well as compound glass transition temperature as indicated by either the temperature at the peak in loss modulus ($T_{pk\ G''}$) or the temperature at the peak in loss tangent tan δ ($T_{pk\ tan\ \delta}$) from dynamic temperature ramp testing at 10 Hz for these eight compounds are summarized in Table 4. Ref 4 made of CPR shows the lowest value of specific gravity among the four compounds. In comparison to the specific gravity for Ref 5 made of SBR and reinforced with carbon black, the specific gravity is 3.10% lower for Ref 8 made of CPR, and 2.30% lower for Ref 7 made of VBR. In comparison to the specific gravity for Ref 9 made of SBR and reinforced with silica, the specific gravity is 2.87% lower for Ref 12 made of CPR, and 2.31% lower for Ref 11 made of VBR.

TABLE 4

| Compounds | Ref 5 | Ref 6 | Ref 7 | Ref 8 | Ref 9 | Ref 10 | Ref 11 | Ref 12 |
|---|---|---|---|---|---|---|---|---|
| Cure testing | at 160° C., 0.5° for 45 min | | | | | | | |
| ML dN · nn | 2.41 | 3.55 | 3.27 | 4.77 | 1.96 | 3.81 | 3.16 | 5.33 |
| MH dN· nn | 15.31 | 17.82 | 15.58 | 23.37 | 22.74 | 25.17 | 24.00 | 32.03 |
| MH-ML | 12.90 | 14.27 | 12.32 | 18.60 | 20.79 | 21.36 | 20.85 | 26.70 |
| $t_{c90}$ min | 14.59 | 7.8 | 20.67 | 7.33 | 25.7 | 6.39 | 27.48 | 9.34 |
| Specific gravity 23° C. | 1.1592 | 1.1374 | 1.1325 | 1.1233 | 1.2056 | 1.1854 | 1.1778 | 1.1710 |
| ARES temp ramp | at 10 Hz, 2° C./min, strain 0.20% for T < 0° C. & 2.0% for T ≥ 0° C. | | | | | | | |
| $T_{pk\ G''}$ (° C.) | −21.4 | −92.8 | −25.8 | −79.1 | −20.4 | −92.2 | −24.5 | −79.1 |
| $T_{pk\ tan\delta}$ (° C.) | −13.1 | −85.2 | −19.8 | −73.5 | −11.4 | −84.2 | −17.2 | −73.1 |

Blends Reinforced with Carbon Black

Four more comparative compounds (Ref. 13-16) were made of a blend of two polymers and reinforced with carbon black according to the formulations shown in Table 5. Ref 13 is made of SBR/cis-BR at 70/30, Ref 14 is made of VBR/cis-BR at 70/30, Ref 15 is made of SBR/CPR at 70/30, Ref 16 is made of SBR/CPR at 5050. Three inventive compounds (Exp 1 to Exp 3) were made of a blend of a high vinyl polybutadiene rubber (VPR) and HCP 54 at the various ratios reported in Table 5. The cure characteristics and specific gravity after curing for these seven compounds are summarized in Table 6.

TABLE 5

|    | Compounds | Ref 13 | Ref 14 | Ref 15 | Ref 16 | Exp 1 | Exp 2 | Exp 3 |
|---|---|---|---|---|---|---|---|---|
| MB: | SBR Duradene 739 | 70 | 0 | 70 | 50 | 0 | 0 | 0 |
|    | cis-BR Diene 140ND | 30 | 30 | 0 | 0 | 0 | 0 | 0 |
|    | Europrene BR HV80 | 0 | 70 | 0 | 0 | 30 | 50 | 70 |
|    | CPR HCP54 | 0 | 0 | 30 | 50 | 70 | 50 | 30 |
|    | Carbon black N234 | 80 | 80 | 80 | 80 | 80 | 80 | 80 |
|    | Oil Sundex 8125 | 32.50 | 32.50 | 32.50 | 32.50 | 32.50 | 32.50 | 32.50 |
|    | Stearic acid | 1.00 | 1.00 | 1.00 | 1.00 | 1.00 | 1.00 | 1.00 |
|    | Nochek 4756A | 1.50 | 1.50 | 1.50 | 1.50 | 1.50 | 1.50 | 1.50 |
|    | Santoflex 6PPD | 2.00 | 2.00 | 2.00 | 2.00 | 2.00 | 2.00 | 2.00 |
|    | Kadox 911 ZnO | 2.50 | 2.50 | 2.50 | 2.50 | 2.50 | 2.50 | 2.50 |
| FB: | CBS | 1.35 | 1.35 | 1.35 | 1.35 | 1.35 | 1.35 | 1.35 |
|    | Sulfur | 1.35 | 1.35 | 1.35 | 1.35 | 1.35 | 1.35 | 1.35 |
|    | Total (phr): | 222.20 | 222.20 | 222.20 | 222.20 | 222.20 | 222.20 | 222.20 |

TABLE 6

| Compounds | Ref 13 | Ref 14 | Ref 15 | Ref 16 | Exp 1 | Exp 2 | Exp 3 |
|---|---|---|---|---|---|---|---|
| Cure testing | at 160° C., 0.5° for 45 min | | | | | | |
| ML dN·m | 2.98 | 3.59 | 3.51 | 3.70 | 4.66 | 4.38 | 3.91 |
| MH dN·m | 15.54 | 16.06 | 18.78 | 19.98 | 22.41 | 19.96 | 18.46 |
| MH-ML | 12.56 | 12.47 | 15.28 | 16.28 | 17.74 | 15.57 | 14.55 |
| $t_{c90}$ min | 9.65 | 8.67 | 9.52 | 8.52 | 7.48 | 8.1 | 10.82 |
| Specific gravity 23° C. | 1.1558 | 1.1361 | 1.1560 | 1.1410 | 1.1256 | 1.1304 | 1.1302 |

In comparison to the specific gravity for Ref 13 made of SBR/cis-BR at 70/30, the specific gravity was 2.21% lower for Exp 3 made of VBR/CPR at 70/30, and 2.61% lower for Exp 1 made of VBR/CPR at 30/70. Note that the novel formulations with CPR and a high vinyl polybutadiene (HV80) and the resulting immiscible blend have a high Tg as compared to the control (ref 13, which is an approximate "all-season" miscible blend having a modest Tg).

Figure 3:
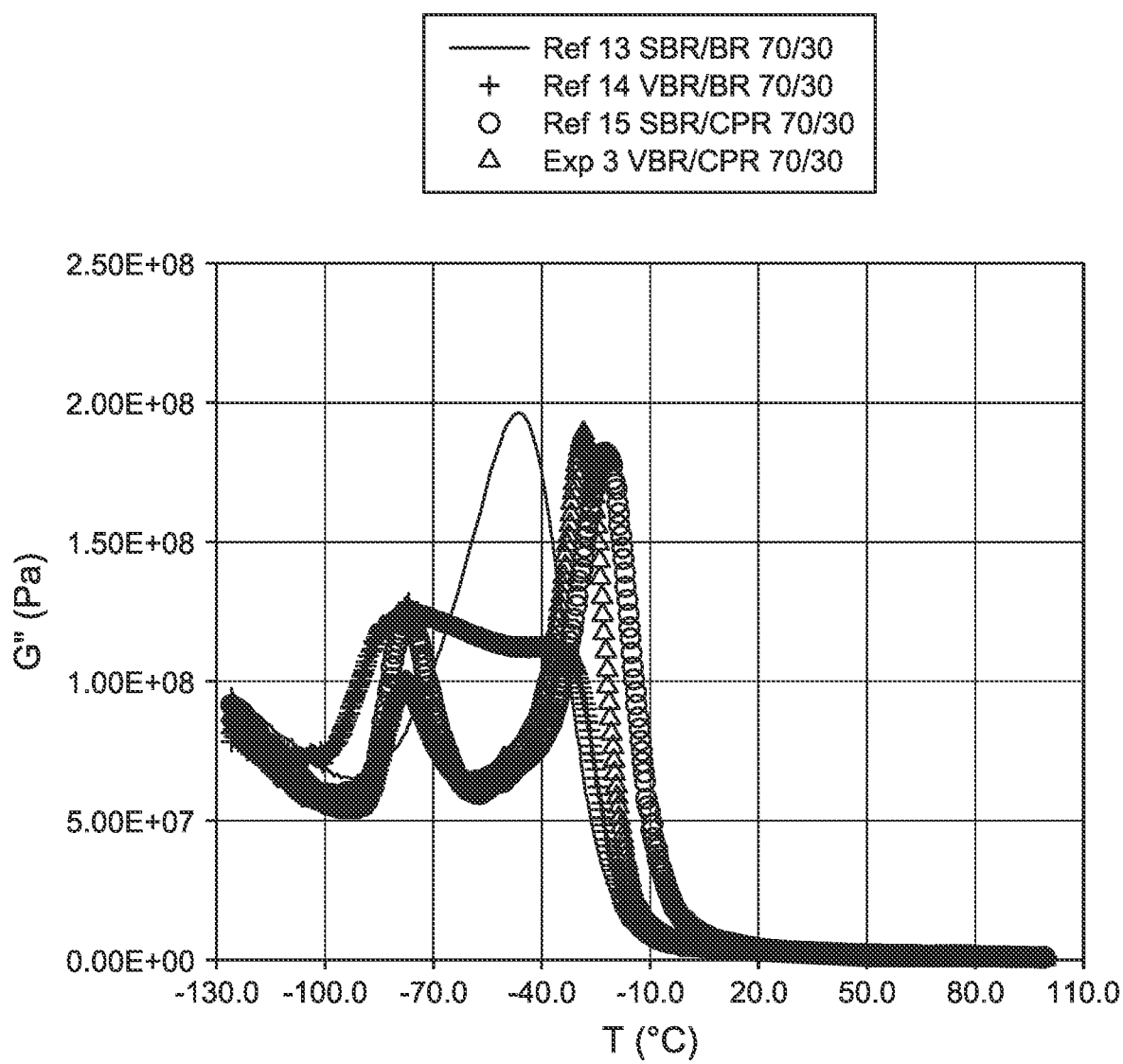
FIG. 3 (FIG. 3) is a plot of loss modulus G" versus temperature T for 70/30 blends of SBR/BR, VBR/BR, SBR/CPR, and VBR/CPR, all reinforced with carbon black.

From dynamic temperature ramp testing at 10 Hz, the compatibility/miscibility of the two polymers in a compound can be revealed. Variation of loss modulus G″ with temperature T is compared in FIG. 3 for the 70/30 blends of SBR/BR (Ref 13), VBR/BR (Ref 14), SBR/CPR (Ref 15), and VBR/CPR (Exp 3). From FIG. 3, the blend of SBR and cis-BR (in Ref 13) appeared to be miscible, the blend of SBR and CPR (in Ref 15) and the blend of VBR and CPR (in Exp 3) appeared to be immiscible. The blend of cis-BR and VBR (in Ref 14) showed a rather limited degree of compatibility.

Compound characteristics from tensile testing and lab predictors for tire performance characteristics from dynamic viscoelastic testing (dynamic temperature ramp testing at 10 Hz with an ARES, or dynamic strain sweep testing at 60° C. & 1 Hz with an RPA) for these seven compounds are summarized in Table 7.

TABLE 7

| Compounds | Ref 13 | Ref 14 | Ref 15 | Ref 16 | Exp 1 | Exp 2 | Exp 3 |
|---|---|---|---|---|---|---|---|
| Tensile RT | ISO 37, Type 3, 508 mm/min | | | | | | |
| Mod100% MPa | 2.24 | 2.29 | 2.70 | 2.65 | 2.71 | 2.60 | 2.49 |
| Mod200% MPa | 5.19 | 5.33 | 6.37 | 6.14 | 6.45 | 6.19 | 5.84 |
| Mod300% MPa | 9.68 | 9.54 | 11.29 | 10.99 | 11.38 | 11.07 | 10.48 |
| Tb MPa | 17.83 | 17.46 | 15.94 | 17.62 | 18.08 | 16.87 | 16.44 |
| Eb % | 483.6 | 489.7 | 404.4 | 450.7 | 443.6 | 423.9 | 436.2 |
| Energy at break J | 5.14 | 5.20 | 4.14 | 5.13 | 5.39 | 4.60 | 4.62 |
| ARES temp ramp | at 10 Hz, 2° C./min, strain 0.20% for T < 0° C. & 2.0% for T ≥ 0° C. | | | | | | |
| tanδ −10° C. (0.20%) | 0.207 | 0.204 | 0.455 | 0.346 | 0.176 | 0.213 | 0.272 |
| tanδ 0° C. (2.0%) | 0.381 | 0.368 | 0.503 | 0.431 | 0.311 | 0.346 | 0.407 |
| tanδ 60° C. (2.0%) | 0.286 | 0.293 | 0.279 | 0.257 | 0.231 | 0.247 | 0.271 |
| G′ 60° C. MPa (2.0%) | 5.97 | 6.42 | 7.29 | 7.16 | 7.50 | 7.46 | 6.90 |
| RPA strain | at 60° C. & 1 Hz | | | | | | |
| tanδ at 5.7% | 0.362 | 0.345 | 0.398 | 0.362 | 0.329 | 0.350 | 0.382 |
| G′ at 5.7% (MPa) | 2.17 | 2.23 | 2.64 | 2.75 | 2.86 | 2.68 | 2.47 |

In comparison to Ref 13 made of SBR/cis-BR at 70/30, Exp 3 made of VBR/CPR at 70/30 exhibited a higher wet traction predictor (tan δ at −10° C., or tan δ at 0° C.), an improved tire rolling loss predictor tan δ at 60° C., along with an improved tire handling predictor G' at 60° C.

Blends Reinforced with Silica

Seven compounds were made of a blend of two polymers and reinforced with silica according to the formulations shown in Table 8. Ref 17 was made of SBR/cis-BR at 70/30, Ref 18 was made of VBR/cis-BR at 70/30, Ref 19 was made of SBR/CPR at 70/30, Ref 20 was made of SBR/CPR at 50/50. Three inventive compounds (Exp 4 to Exp 6) were made of VBR/CPR at the ratios reported in Table 8. The cure characteristics and specific gravity after curing for these eight compounds are summarized in Table 9.

TABLE 8

|  | Compounds | Ref 17 | Ref 18 | Ref 19 | Ref 20 | Exp 4 | Exp 5 | Exp 6 |
|---|---|---|---|---|---|---|---|---|
| MB: | SBR Duradene 739 | 70 | 0 | 70 | 50 | 0 | 0 | 0 |
|  | cis-BR Diene 140ND | 30 | 30 | 0 | 0 | 0 | 0 | 0 |
|  | Europrene BR HV80 | 0 | 70 | 0 | 0 | 30 | 50 | 70 |
|  | CPR HCP54 | 0 | 0 | 30 | 50 | 70 | 50 | 30 |
|  | silica Zeosil 1165MP | 80 | 80 | 80 | 80 | 80 | 80 | 80 |
|  | Silane X 50-S | 12.8 | 12.8 | 12.8 | 12.8 | 12.80 | 12.80 | 12.80 |
|  | Oil Sundex 8125 | 32.50 | 32.50 | 32.50 | 32.50 | 32.50 | 32.50 | 32.50 |
|  | Stearic acid | 1.00 | 1.00 | 1.00 | 1.00 | 1.00 | 1.00 | 1.00 |
|  | Nochek 4756A | 1.50 | 1.50 | 1.50 | 1.50 | 1.50 | 1.50 | 1.50 |
|  | Santoflex 6PPD | 2.00 | 2.00 | 2.00 | 2.00 | 2.00 | 2.00 | 2.00 |
|  | Kadox 911 ZnO | 2.50 | 2.50 | 2.50 | 2.50 | 2.50 | 2.50 | 2.50 |
| FB: | DPG | 2.00 | 2.00 | 2.00 | 2.00 | 2.00 | 2.00 | 2.00 |
|  | CBS | 1.70 | 1.70 | 1.70 | 1.70 | 1.70 | 1.70 | 1.70 |
|  | Sulfur | 1.40 | 1.40 | 1.40 | 1.40 | 1.40 | 1.40 | 1.40 |
|  | Total (phr): | 237.40 | 237.40 | 237.40 | 237.40 | 237.40 | 237.40 | 237.40 |

TABLE 9

| Compounds | Ref 17 | Ref 18 | Ref 19 | Ref 20 | Exp 4 | Exp 5 | Exp 6 |
|---|---|---|---|---|---|---|---|
| Cure testing | at 160° C., 0.5° for 45 min | | | | | | |
| ML dN · m | 1.97 | 2.88 | 2.74 | 3.63 | 5.25 | 4.62 | 3.78 |
| MH dN · m | 21.39 | 21.93 | 25.41 | 28.32 | 32.41 | 28.82 | 26.36 |
| MH-ML | 19.42 | 19.05 | 22.67 | 24.69 | 27.16 | 24.20 | 22.58 |
| t$_{c90}$ min | 18.08 | 20.94 | 22.7 | 18.3 | 12.78 | 18.1 | 23.54 |
| Specific gravity 23° C. | 1.1997 | 1.1807 | 1.1996 | 1.1921 | 1.1732 | 1.1768 | 1.1746 |

Figure 4:
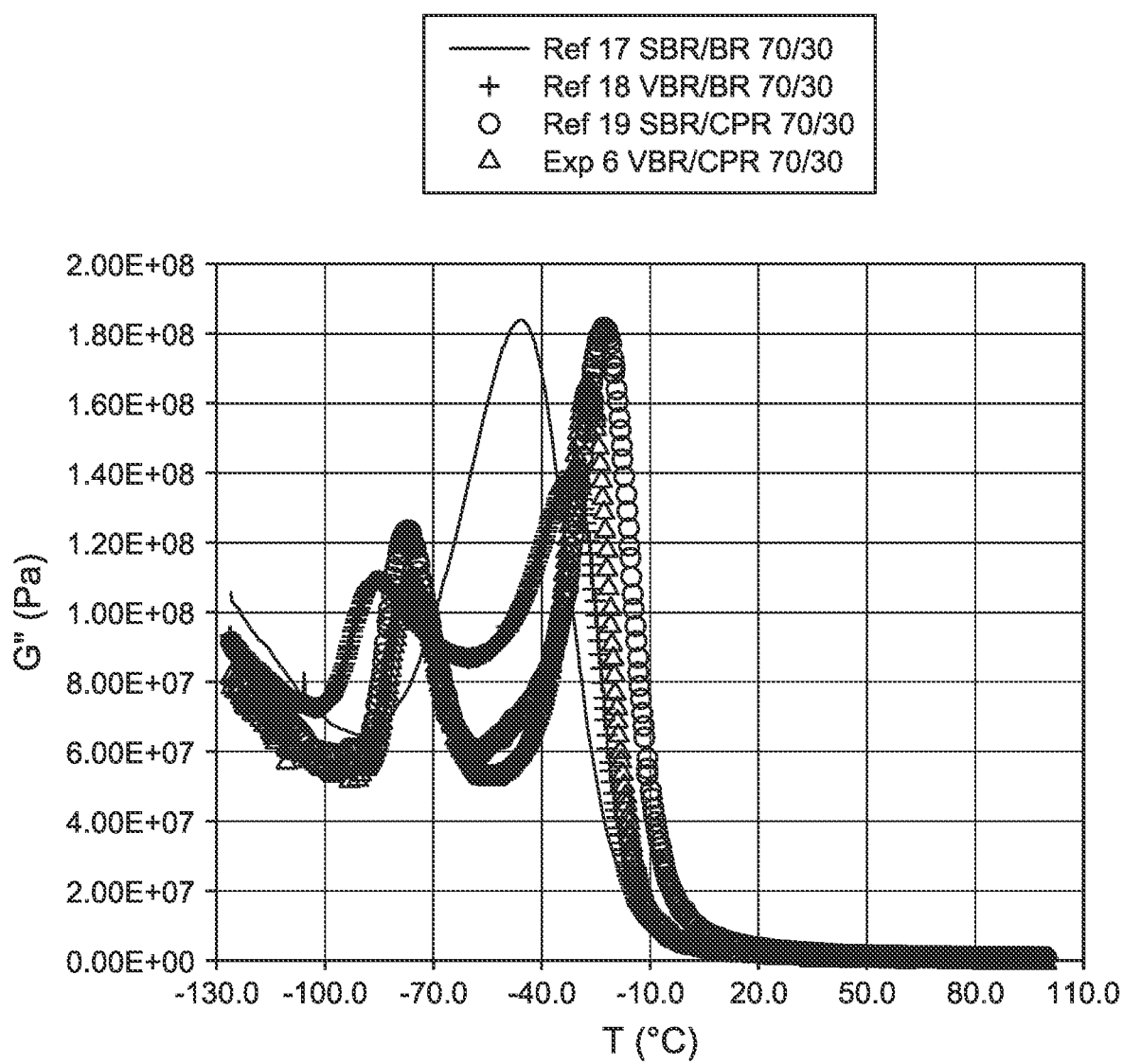
FIG. 4 (FIG. 4) is a plot of loss modulus G" versus temperature T for 70/30 blends of SBR/BR, VBR/BR, SBR/CPR, and VBR/CPR, all reinforced with silica.

In comparison to the specific gravity for Ref 17 made of SBR/cis-BR at 70/30, the specific gravity was 2.09% lower for Exp 6 made of VBR/CPR at 70/30, and 2.21% lower for Exp 4 made of VBR/CPR at 30/70. Variation of loss modulus G" with temperature T is compared in FIG. 4 below for Ref 17 to 20 compounds. From FIG. 4, it appears that the blend of SBR and cis-BR (in Ref 17) is miscible. In contrast, the blend of cis-BR and VBR (in Ref 18), the blend of SBR and CPR (in Ref 19) and the blend of VBR and CPR (in Exp 6) all were immiscible when reinforced with silica.

Compound characteristics from tensile testing and lab predictors for tire performance characteristics from dynamic viscoelastic testing (dynamic temperature ramp testing at 10 Hz with an ARES, or dynamic strain sweep testing at 60° C. & 1 Hz with an RPA) for these seven compounds are summarized in Table 10.

TABLE 10

| Compounds | Ref 17 | Ref 18 | Ref 19 | Ref 20 | Exp 4 | Exp 5 | Exp 6 |
|---|---|---|---|---|---|---|---|
| Tensile RT | ISO 37, Type 3, 508 mm/min | | | | | | |
| Mod100% MPa | 3.22 | 3.09 | 3.38 | 3.24 | 3.42 | 3.57 | 3.41 |
| Mod200% MPa | 7.45 | 7.36 | 7.83 | 7.25 | 7.54 | 7.93 | 7.94 |
| Mod300% MPa | 13.20 | 13.38 | 12.10 | 13.00 | 13.40 | 12.58 | 14.24 |
| Tb MPa | 16.57 | 14.41 | 15.16 | 17.684 | 18.17 | 16.27 | 13.57 |
| Eb % | 357.0 | 317.8 | 319.4 | 376.8 | 374.7 | 334.3 | 290.5 |
| Energy at break J | 3.72 | 2.66 | 3.08 | 4.22 | 4.43 | 3.43 | 2.46 |
| ARES temp ramp | at 10 Hz, 2° C./min, strain 0.20% for T < 0° C. & 2.0% for T ≥ 0° C. | | | | | | |
| tanδ −10° C. (0.20%) | 0.254 | 0.326 | 0.536 | 0.377 | 0.188 | 0.262 | 0.370 |
| tanδ 0° C. (2.0%) | 0.367 | 0.352 | 0.551 | 0.431 | 0.279 | 0.345 | 0.398 |

TABLE 10-continued

| Compounds | Ref 17 | Ref 18 | Ref 19 | Ref 20 | Exp 4 | Exp 5 | Exp 6 |
|---|---|---|---|---|---|---|---|
| tanδ 60° C. (2.0%) | 0.190 | 0.156 | 0.179 | 0.171 | 0.144 | 0.157 | 0.152 |
| G' 60° C. MPa (2.0%) | 7.22 | 6.10 | 7.75 | 8.44 | 9.84 | 8.50 | 6.93 |
| RPA strain | at 60° C. & 1 Hz | | | | | | |
| tanδ at 5.7% | 0.270 | 0.246 | 0.316 | 0.285 | 0.244 | 0.259 | 0.257 |
| G' at 5.7% (MPa) | 2.48 | 2.45 | 3.16 | 3.19 | 3.38 | 3.11 | 2.81 |

In comparison to Ref 17 made of SBR/cis-BR at 70/30, Exp 6 made of VBR/CPR at 70/30 exhibited a higher wet traction predictor (tan δ at −10° C., or tan δ at 0° C.) in combination with a lower tire rolling loss predictor tan δ at 60° C.

Embodiments discussed and described herein can be further described with the following examples. Although the following examples are directed to specific embodiments, they are not to be viewed as limiting in any specific respect.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," "having," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

While the foregoing is directed to embodiments of the present invention, other and further embodiments of the invention may be devised without departing from the basic scope thereof, and the scope thereof is determined by the claims that follow.

What is claimed is:

1. A rubber compound for tire treads, comprising:
   30 phr to 70 phr of a cyclopentene ring-opening rubber having a glass transition temperature (Tg) of −120° C. to −80° C., a ratio of cis to trans of 5:95 to 20:80, and a weight average molecular weight (Mw) of 300 kDa to 500 kDa; and
   20 phr to 60 phr of a high vinyl polybutadiene rubber having a vinyl content of at least about 50% vinyl.

2. The rubber compound of claim 1, further comprising 20 phr to 100 phr of a reinforcing filler.

3. The rubber compound of claim 1, further comprising 0.5 phr to 50 phr of a process oil.

4. The rubber compound of claim 1, wherein the cyclopentene ring-opening rubber has an Mw/Mn of 1 to 10.

5. The rubber compound of claim 1, further comprising a curative.

6. The rubber compound of claim 1, wherein the cyclopentene ring-opening rubber has a melting temperature of 35° C. or less.

7. The rubber compound of claim 1, wherein the rubber has a ratio of cis to trans of 30:70 to 10:90.

8. The rubber compound of claim 1, further comprising a reinforcing filler comprising silica, curative, and a silica coupling agent.

9. The rubber compound of claim 1, wherein the rubber compound has a wet skid resistance (tan δ at −10° C., strain at 0.20%) of 0.10 to 0.5.

10. The rubber compound of claim 1, wherein the rubber compound has a wet skid resistance (tan δ at 0° C., strain at 2.0%) of 0.2 to 0.5.

11. The rubber compound of claim 1, wherein the rubber compound has a tensile stress at 300% elongation (300% Modulus) at room temperature of 10 MPa to 14 MPa.

12. The rubber compound of claim 1, wherein the rubber compound has a tensile at break of 15 to 30 MPa and an elongation at break of 400% to 600%.

13. The rubber compound of claim 1, further comprising a reinforcing filler of carbon black, silica, or a mixture thereof.

14. The rubber compound of claim 1, wherein the rubber compound has a wear loss (tan δ at 60° C., strain at 2.0%) of 0.2 to 0.35.

15. The rubber compound of claim 1, wherein the rubber compound has a tire handling (G' at 60° C., strain at 2.0%) of 5 MPa to 8 MPa.

* * * * *